(12) United States Patent
Chen

(10) Patent No.: US 11,451,509 B2
(45) Date of Patent: Sep. 20, 2022

(54) DATA TRANSMISSION METHOD AND COMPUTER SYSTEM

(71) Applicant: HUAWEI TECHNOLOGIES CO., LTD., Shenzhen (CN)

(72) Inventor: Gang Chen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/373,025

(22) Filed: Jul. 12, 2021

(65) Prior Publication Data

US 2021/0344643 A1 Nov. 4, 2021

Related U.S. Application Data

(63) Continuation of application No. PCT/CN2020/073023, filed on Jan. 19, 2020.

(30) Foreign Application Priority Data

Mar. 15, 2019 (CN) .......................... 201910199742.4

(51) Int. Cl.
*H04L 61/256* (2022.01)
*H04L 61/2521* (2022.01)
(Continued)

(52) U.S. Cl.
CPC ........ *H04L 61/256* (2013.01); *H04L 61/2535* (2013.01); *H04L 61/5046* (2022.05); *H04L 2101/668* (2022.05)

(58) Field of Classification Search
CPC ............. H04L 61/2503; H04L 61/2514; H04L 61/2521; H04L 61/2535; H04L 61/256;
(Continued)

(56) References Cited

U.S. PATENT DOCUMENTS 7,814,541 B1 * 10/2010 Manvi ................. H04L 61/2535
726/13
10,498,693 B1 * 12/2019 Strauss ............... H04L 61/2592
(Continued)

FOREIGN PATENT DOCUMENTS

CN 103023898 A 4/2013
CN 106789367 A 5/2017
(Continued)

OTHER PUBLICATIONS

WO 2009/062504 A1, WIPO, Jacobsen et al., dated May 2019, H04L 61/2535 (Year: 2019).*
(Continued)

*Primary Examiner* — Vivek Srivastava
*Assistant Examiner* — William C McBeth
(74) *Attorney, Agent, or Firm* — Hauptman Ham, LLP

(57) ABSTRACT

A data transmission method includes determining that a first network address segment overlaps with a second network address segment, and creating at least two subnets on a virtual private cloud (VPC). The first network address segment is a network address segment of a subnet in which a target server is located, and configured to run on the VPC. The first network address segment belongs to a network address segment of the VPC. The second network address segment is a network address segment of a subnet in which a first electronic device is located. A network address segment of one of the at least two subnets on the VPC does not overlap with the first or second network address segment. Network interfaces in the at least two subnets are configured to sequentially forward a data packet being transmitted between the target server and the first electronic device at least two times.

10 Claims, 10 Drawing Sheets

(51) Int. Cl.
*H04L 61/5046* (2022.01)
*H04L 101/668* (2022.01)

(58) Field of Classification Search
CPC ............ H04L 61/2592; H04L 61/5046; H04L 61/5061; H04L 2101/668
See application file for complete search history.

(56) References Cited

U.S. PATENT DOCUMENTS

| | | | |
|---|---|---|---|
| 10,541,966 B1* | 1/2020 | Wei | H04L 61/2521 |
| 11,099,099 B1* | 8/2021 | Wei | H04L 45/16 |
| 2002/0003780 A1* | 1/2002 | Braun | H04L 45/28 |
| | | | 370/254 |
| 2002/0186698 A1 | 12/2002 | Ceniza | |
| 2005/0066035 A1* | 3/2005 | Williams | H04L 61/5046 |
| | | | 709/245 |
| 2009/0016360 A1 | 1/2009 | Kurita | |
| 2011/0026537 A1 | 2/2011 | Kolhi et al. | |
| 2012/0166629 A1 | 6/2012 | Imamura | |
| 2013/0103834 A1* | 4/2013 | Dzerve | H04L 61/2514 |
| | | | 709/225 |
| 2014/0123270 A1* | 5/2014 | Liu | H04L 63/0272 |
| | | | 726/15 |
| 2015/0281059 A1 | 10/2015 | Xiao | |
| 2020/0153736 A1* | 5/2020 | Liebherr | H04L 61/2535 |

FOREIGN PATENT DOCUMENTS

| | | |
|---|---|---|
| CN | 107241457 A | 10/2017 |
| CN | 108965092 A | 12/2018 |
| CN | 109361764 A | 2/2019 |
| CN | 107809365 B | 1/2021 |
| EP | 2498449 B1 | 11/2016 |
| JP | 2015226131 A * | 12/2015 ........... H04L 45/741 |

OTHER PUBLICATIONS

International Search Report issued in corresponding International Application No. PCT/CN2020/073023, dated Apr. 7, 2020, pp. 1-9.
Chinese Notice of Allowance issued in corresponding Chinese Application No. 201910199742.4, dated Jul. 19, 2021, pp. 1-4.
Chinese Office Action issued in corresponding Chinese Application No. 201910199742.4, dated Mar. 5, 2021, pp. 1-4.
Chinese Search Report issued in corresponding Chinese Application No. 201910199742.4, dated Feb. 24, 2021, pp. 1-3.
P. Srisuresh et al., "IP Network Address Translator (NAT) Terminology and Considerations", Request for Comments: 2663, Network Working Group, total 30 pages.
European Search Report issued in corresponding European Application No. 20773427.8, dated Nov. 26, 2021, pp. 1-9, European Patent Office, Munich, Germany.

* cited by examiner

800

| Determine that a fourth network address segment overlaps with a fifth network address segment, where the fourth network address segment is a network address segment of a subnet in which a third electronic device unconnected to a target server is located, and the fifth network address segment is a network address segment of a subnet in which a fourth electronic device connected to the target server is located | 810 |

| Create at least one subnet on a third VPC, where any one of the at least one subnet does not overlap with a first subnet, a fourth subnet, or a fifth subnet | 820 |

FIG. 8

DATA TRANSMISSION METHOD AND COMPUTER SYSTEM

CROSS-REFERENCE TO RELATED APPLICATIONS

This application is a continuation of International Application No. PCT/CN2020/073023, filed on Jan. 19, 2020, which claims priority to Chinese Patent Application No. 201910199742.4, filed on Mar. 15, 2019, the disclosures of the aforementioned applications are hereby incorporated by reference in their entireties.

TECHNICAL FIELD

This application relates to the cloud computing field, and more specifically, to a data transmission method and a computer system.

BACKGROUND

With development of information technologies, many companies have set up branches or subsidiaries in different regions or countries. The branches or subsidiaries in different regions or countries expect to deploy and connect services through networks. To reduce costs, a user expects that a data center is to be deployed on a cloud to facilitate access by an on-premises user in the branches or the subsidiaries. The data center may be, for example, an application center, or a service center.

A virtual private cloud (VPC) may provide a secure and private network environment for a user. For example, an on-premises user may access the VPC in a manner such as a VPN connection, to access a data center on a cloud.

However, because telecommunications network operators are different in different regions, there is a high probability that internet protocol (IP) network address segments provided by these telecommunications network operators overlap with an IP network address segment of an on-premises server. Once IP addresses overlap, a data packet may fail to be correctly sent, affecting user experience, or even causing a huge economic loss to a user.

SUMMARY

This application provides a data transmission method and a computer system, to correctly transmit a data packet, and improve user experience.

According to a first aspect, at least an embodiment of a data transmission method includes determining that a first network address segment overlaps with a second network address segment, where the first network address segment is a network address segment of a subnet in which a target server is located, the target server is a server running on a first VPC, the first network address segment belongs to a network address segment of the first VPC, and the second network address segment is a network address segment of a subnet in which a first electronic device is located; and creating at least two subnets on the first VPC, where a network address segment of any one of the at least two subnets does not overlap with the first network address segment or the second network address segment, and network interfaces in the at least two subnets are used to sequentially forward a data packet being transmitted between the target server and the first electronic device, so that the data packet is forwarded for at least two times during transmission of the data packet.

In some embodiments, the method may be executed by a server running on the first VPC. For example, the server may be the target server or another server. This is not limited in this application.

Based on the foregoing technical solution, when network address segment overlapping occurs between the first electronic device and the target server, the at least two subnets are created on the first VPC, to implement interconnection between the first electronic device and a software system. Because the network address segment of any one of the at least two subnets does not overlap with the network address segment of the first electronic device or the network address segment of the target server, a unique destination IP address can be found for a data packet in a process for transmitting the data packet. In this way, the data packet can be correctly transmitted between the first electronic device and the software system, and user experience can be improved. In addition, in the technical solutions provided in this application, one or more extra servers are not created, or extra software system on some server (for example, a newly created server) is not deployed. Therefore, implementation costs are relatively low, and a deployment period is relatively short.

With reference to the first aspect, in some embodiments, the data packet is forwarded through each of at least two network interfaces after IP address translation is performed, the at least two network interfaces one-to-one correspond to the at least two subnets, and an IP address of each network interface belongs to a corresponding subnet.

Specifically, a network interface in each of the at least two subnets is used to perform IP address translation on a received data packet based on a predetermined route, so that the data packet from the target server is forwarded to the first electronic device after IP address translation is sequentially performed on the data packet in the at least two subnets.

Correspondingly, the network interface in each of the at least two subnets is used to perform IP address translation on a received data packet based on a predetermined route, so that the data packet from the first electronic device is forwarded to the target server after IP address translation is sequentially performed on the data packet in the at least two subnets.

A destination network address is translated, so that the data packet from the first electronic device can arrive at the target server after being forwarded in the at least two newly created subnets, or the data packet from the target server can arrive at the first electronic device after being forwarded in the at least two newly created subnets.

A source network address is translated, so that a return path of a data packet can be further obtained. For example, after receiving a data packet from the first electronic device, the target server may feed back a response message to the first electronic device over a return path; or after receiving a data packet from the target server, the first electronic device may feed back a response message to the target server over a return path.

It should be understood that IP address translation, for example, may be implemented by network address translation (network address translation, NAT) software, or may be jointly implemented by destination network address translation (destination network address translation, DNAT) software and source network address translation (source network address translation, SNAT) software, or may be implemented by other software or hardware that can implement a same or similar function. This is not limited in this application.

With reference to the first aspect, in some embodiments, the at least two network interfaces are configured on the target server.

The at least two network interfaces are configured on the target server. In this way, a waste of server resources can be reduced. The at least two network interfaces corresponding to the at least two newly created subnets may be added on the target server, and an IP address of each network interface belongs to a corresponding subnet.

With reference to the first aspect, in some embodiments, the method further includes: creating a second server on the first VPC; and configuring the at least two network interfaces on the second server.

The at least two network interfaces are configured on the second server, namely, configured on a server different from the target server. In this way, a user does not expect to restart the target server can be satisfied, and user experience can be improved. At least two network interfaces corresponding to the at least two newly created subnets may be configured on the second server, and an IP address of each network interface belongs to a corresponding subnet.

With reference to the first aspect, in some embodiments, the at least two network interfaces are primary network interfaces; and the method further includes: creating a third server on the first VPC; and configuring at least two secondary network interfaces on the third server, where the at least two secondary network interfaces one-to-one correspond to the at least two primary network interfaces, a network address segment to which an IP address of each primary network interface belongs is the same as a network address segment to which an IP address of a corresponding secondary network interface belongs, and each primary network interface and a corresponding secondary network interface have a same floating IP address. The third server may be used as a secondary server of the target server or the second server. A network interface configured for the third server is a secondary network interface. A network interface configured for the target server or the second server is a primary network interface. A same floating IP address is set for a primary network interface and a secondary network interface whose IP addresses belong to a same subnet. In this way, high availability in a primary/secondary mode can be implemented, highly reliable services can be obtained, and user experience can be improved.

With reference to the first aspect, in some embodiments, the method further includes: determining that a third network address segment overlaps with the first network address segment, where the third network address segment is a network address segment of a subnet in which a second electronic device is located; and creating at least two subnets on a second VPC, where there is a communication connection between the second VPC and the first VPC, and a network address segment of any one of the at least two subnets does not overlap with the first network address segment, the second network address segment, or the third network address segment, and network interfaces in the at least two subnets are used to sequentially forward a data packet being transmitted between the target server and the second electronic device, so that the data packet is forwarded for at least two times during transmission of the data packet.

Further, when a plurality of electronic devices expect to access the same target server, network address segment overlapping may occur between the plurality of electronic devices. In this case, a new VPC, namely, the second VPC, may be created, and at least two subnets are created on the newly created second VPC. Network address segments of the at least two subnets created on the second VPC do not overlap with the first network address segment or the second network address segment. In this way, interconnection and data transmission can be implemented through different paths between any two electronic devices on which network address segment overlapping occurs and the target server.

In this embodiment of this application, in a scenario in which a plurality of electronic devices access the target server, corresponding technical solutions are provided for both the case in which network address segment overlapping occurs between the target server and the electronic device and the case in which network address segment overlapping occurs between the electronic devices. Therefore, interconnection is implemented between the electronic device and the target server, and one center can be accessed by any quantity of users.

According to a second aspect, a data transmission method is provided. The method includes: determining that a fourth network address segment overlaps with a fifth network address segment, where the fourth network address segment is a network address segment of a subnet in which a third electronic device is located, the fifth network address segment is a network address segment of a subnet in which a fourth electronic device is located, there is a network connection relationship between the fourth electronic device and a target server, the target server is a server running on a first VPC, an IP address of the first network interface belongs to a first network address segment, and the first network address segment belongs to a network address segment of the first VPC; and creating at least one subnet on a third VPC, where there is a communication connection between the third VPC and the first VPC, and a network address segment of any one of the at least one subnet does not overlap with the first network address segment, the fourth network address segment, or the fifth network address segment, and a network interface in the at least one subnet is used to forward a data packet being transmitted between the target server and the third electronic device, so that the data packet is forwarded for at least one time during transmission of the data packet.

It should be understood that the method may be executed by a server running on the first VPC. For example, the server may be the target server or another server. This is not limited in this application.

Based on the foregoing technical solution, when network address segment overlapping occurs between a plurality of electronic devices that access the target server, a new VPC is created for the newly connected third electronic device, and a new subnet is created on the newly created VPC, to implement interconnection between the third electronic device and the target server. Because a network address segment of the subnet on the newly created VPC does not overlap with the network address segment of the fourth electronic device or the network address segment of the target server, a unique destination address can be found for a data packet in a process for transmitting the data packet. In this way, the data packet can be correctly transmitted between the third electronic device and the target server, and user experience can be improved. In addition, in the technical solutions provided in this application, extra servers are not created, or extra software system is not deployed on some server (for example, a newly created server). Therefore, implementation costs are relatively low, and a deployment period is relatively short.

With reference to the second aspect, in some embodiments, the data packet is forwarded through each of at least two network interfaces after IP address translation is performed, the at least two network interfaces one-to-one correspond to the at least two subnets, and an IP address of each network interface belongs to a corresponding subnet.

Specifically, a network interface in each of the at least one subnet is used to perform IP address translation on a received data packet based on a predetermined route, so that the data packet from the target server is forwarded to the third electronic device after IP address translation is sequentially performed on the data packet in the at least one subnet.

Correspondingly, the network interface in each of the at least one subnet is used to perform IP address translation on a received data packet based on a predetermined route, so that the data packet from the third electronic device is forwarded to the target server after IP address translation is sequentially performed on the data packet in the at least one subnet.

A destination network address is translated, so that the data packet from the third electronic device can arrive at the target server after being forwarded in the at least one newly created subnet, or the data packet from the target server can arrive at the third electronic device after being forwarded in the at least one newly created subnet.

A source network address is translated, so that a return path of a data packet can be further obtained. For example, after receiving a data packet from the third electronic device, the target server may feed back a response message to the third electronic device over a return path; or after receiving a data packet from the target server, the third electronic device may feed back a response message to the target server over a return path.

It should be understood that the IP address translation, for example, may be implemented by NAT software, or may be jointly implemented by DNAT software and SNAT software, or may be implemented by other software or hardware that can implement a same or similar function. This is not limited in this application.

With reference to the second aspect, in some embodiments, the method further includes: creating the third VPC.

It should be understood that the third VPC may be newly created, or may be an existing VPC. This is not limited in this application.

With reference to the second aspect, in some embodiments, the method further includes: creating a fourth server on the third VPC; and configuring the at least one network interface on the fourth server.

To be specific, the fourth server is created on the newly created third VPC, the at least one network interface corresponding to the at least one newly created subnet may be configured on the server, and an IP address of each network interface belongs to a corresponding subnet.

With reference to the second aspect, in some embodiments, the at least one network interface is a primary network interface; and the method further includes: creating a fifth server on the third VPC; and configuring at least one secondary network interface on the fifth server, where the at least one secondary network interface one-to-one corresponds to the at least one primary network interface, a network address segment to which an IP address of each primary network interface belongs is the same as a network address segment to which an IP address of a corresponding secondary network interface belongs, and each primary network interface and a corresponding secondary network interface have a same floating IP address.

The fifth server may be used as a secondary server of the fourth server or the target server. A network interface configured for the fifth server is a secondary network interface. A network interface configured for the fourth server is a primary network interface. A same floating IP address is set for a primary network interface and a secondary network interface whose IP addresses belong to a same subnet. In this way, high availability in a primary/secondary mode can be implemented, highly reliable services can be obtained, and user experience can be improved.

According to a third aspect, a computer system is provided. The computer system includes modules that can be configured to implement the method according to any one of the first aspect and any possible implementation of the first aspect.

Specifically, the computer system includes a determining module and a creation module. The determining module is configured to: determine that a first network address segment overlaps with a second network address segment, where the first network address segment is a network address segment of a subnet in which a target server is located, the target server is a server running on a first VPC, the first network address segment belongs to a network address segment of the first VPC, and the second network address segment is a network address segment of a subnet in which a first electronic device is located. The creation module is configured to create at least two subnets on the first VPC, where a network address segment of any one of the at least two subnets does not overlap with the first network address segment or the second network address segment, and network interfaces in the at least two subnets are used to sequentially forward a data packet being transmitted between the target server and the first electronic device, so that the data packet is forwarded for at least two times during transmission of the data packet.

With reference to the third aspect, in some implementations of the third aspect, the data packet is forwarded through each of at least two network interfaces after IP address translation is performed, the at least two network interfaces one-to-one correspond to the at least two subnets, and an IP address of each network interface belongs to a corresponding subnet.

With reference to the third aspect, in some implementations of the third aspect, the at least two network interfaces are configured on the target server.

With reference to the third aspect, in some implementations of the third aspect, the creation module is further configured to create a second server on the first VPC; and the computer system further includes a configuration module, where the configuration module is configured to configure the at least two network interfaces on the second server.

With reference to the third aspect, in some implementations of the third aspect, the network interfaces corresponding to the at least two subnets are primary network interfaces; the creation module is further configured to create a third server on the first VPC; and the configuration module is further configured to configure at least two secondary network interfaces on the third server, where the at least two secondary network interfaces one-to-one correspond to the at least two primary network interfaces, a network address segment to which an IP address of each primary network interface belongs is the same as a network address segment to which an IP address of a corresponding secondary network interface belongs, and each primary network interface and a corresponding secondary network interface have a same floating IP address.

With reference to the third aspect, in some implementations of the third aspect, the determining module is further configured to determine that a third network address segment overlaps with the first network address segment, where the third network address segment is a network address segment of a subnet in which a second electronic device is located. The creation module is further configured to create at least two subnets on a second VPC, where there is a communication connection between the second VPC and the first VPC, and a network address segment of any one of the at least two subnets does not overlap with the first network address segment, the second network address segment, or the third network address segment, and network interfaces in the at least two subnets are used to sequentially forward a data packet being transmitted between the target server and the second electronic device, so that the data packet is forwarded for at least two times during transmission of the data packet.

According to a fourth aspect, a computer system is provided. The computer system includes modules that can be configured to implement the method according to any one of the second aspect and any possible implementation of the second aspect.

Specifically, the computer system includes a determining module and a creation module. The determining module is configured to determine that a fourth network address segment overlaps with a fifth network address segment, where the fourth network address segment is a network address segment of a subnet in which a third electronic device is located, the fifth network address segment is a network address segment of a subnet in which a fourth electronic device is located, there is a network connection relationship between the fourth electronic device and a target server, the target server is a server running on a VPC, an IP address of the first network interface belongs to a first network address segment, and the first network address segment belongs to a network address segment of the first VPC. The creation module is configured to create at least one subnet on a third VPC, where there is a communication connection between the third VPC and the first VPC, and a network address segment of any one of the at least one subnet does not overlap with the first network address segment, the fourth network address segment, or the fifth network address segment, and a network interface in the at least one subnet is used to forward a data packet being transmitted between the target server and the third electronic device, so that the data packet is forwarded for at least one time during transmission of the data packet.

With reference to the fourth aspect, in some implementations of the fourth aspect, the data packet is forwarded through each of at least one network interface after IP address translation is performed, the at least one network interface one-to-one corresponds to the at least one subnet, and an IP address of each network interface belongs to a corresponding subnet.

With reference to the fourth aspect, in some implementations of the fourth aspect, the creation module is further configured to create the third VPC.

With reference to the fourth aspect, in some implementations of the fourth aspect, the creation module is further configured to create a fourth server on the third VPC; and the computer system further includes a configuration module, and the configuration module is configured to configure, on the fourth server, the at least one network interface corresponding to the at least one subnet.

With reference to the fourth aspect, in some implementations of the fourth aspect, the at least one network interface corresponding to the at least one subnet is a primary network interface; the creation module is further configured to create a fifth server on the third VPC; and the configuration module is further configured to configure at least one secondary network interface on the fifth server, where the at least one secondary network interface one-to-one corresponds to the at least one primary network interface, a network address segment to which an IP address of each primary network interface belongs is the same as a network address segment to which an IP address of a corresponding secondary network interface belongs, and each primary network interface and a corresponding secondary network interface have a same floating IP address.

According to a fifth aspect, a computer system is provided. The computer system includes a processor, a memory, and a communications interface.

The memory may be configured to store program code and data of the computer system. Therefore, the memory may be a storage unit inside the processor, an external storage unit independent of the processor, or a component including a storage unit inside the processor and an external storage unit independent of the processor.

The memory may include a volatile memory (volatile memory) such as a random access memory (RAM), or the memory may include a non-volatile memory (non-volatile memory) such as a read-only memory (ROM), a flash memory (flash memory), a hard disk drive (HDD), or a solid-state drive (SSD), or the memory may include a combination of the foregoing types of memories. The memory may be configured to store a set of program code, so that the processor invokes the program code stored in the memory to implement functions of a communications module and/or a processing module in the embodiments of the present disclosure.

The processor may include one or more general-purpose processors. For example, the processor may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may alternatively be a combination of implementing a computing function, for example, a combination of a plurality of microprocessors or a combination of a DSP and a microprocessor. The processor may be configured to run a program with a processing function in related program code. In other words, the processor may implement a function of the processing module by executing the program code. For specific functions of the modules, refer to related descriptions in the third aspect.

It should be understood that the processor may alternatively be a set including a processor of at least one computing device. This is not specifically limited in this application.

In a possible implementation, the at least one processor in the computing device is jointly configured to run related program code to implement the functions of the modules in the third aspect or the fourth aspect in this application.

In another possible implementation, a processor in each computing device may be independently configured to run related program code to implement the functions of the modules in the third aspect or the fourth aspect in this application.

The communications interface may be a wired interface (for example, an Ethernet interface) or a wireless interface (for example, a cellular network interface or a wireless local area network interface), and is configured to communicate with another module/device.

The processor is configured to invoke the computer program from the memory and run the computer program, to enable the computer system to perform the method according to any one of the first aspect or the second aspect or the embodiments of the first aspect or the second aspect.

According to a sixth aspect, a computer-readable medium is provided. The computer-readable medium stores program code. When the computer program code is run on a computer, the computer is enabled to perform the method according to each of the foregoing aspects.

According to a seventh aspect, a computer program product is provided. The computer program product includes computer program code. When the computer program code is run on a computer, the computer is enabled to perform the method according to each of the foregoing aspects.

BRIEF DESCRIPTION OF DRAWINGS

FIG. 8 is a schematic flowchart of a data transmission method according to another embodiment of this application;

DESCRIPTION OF EMBODIMENTS

Figure 1:
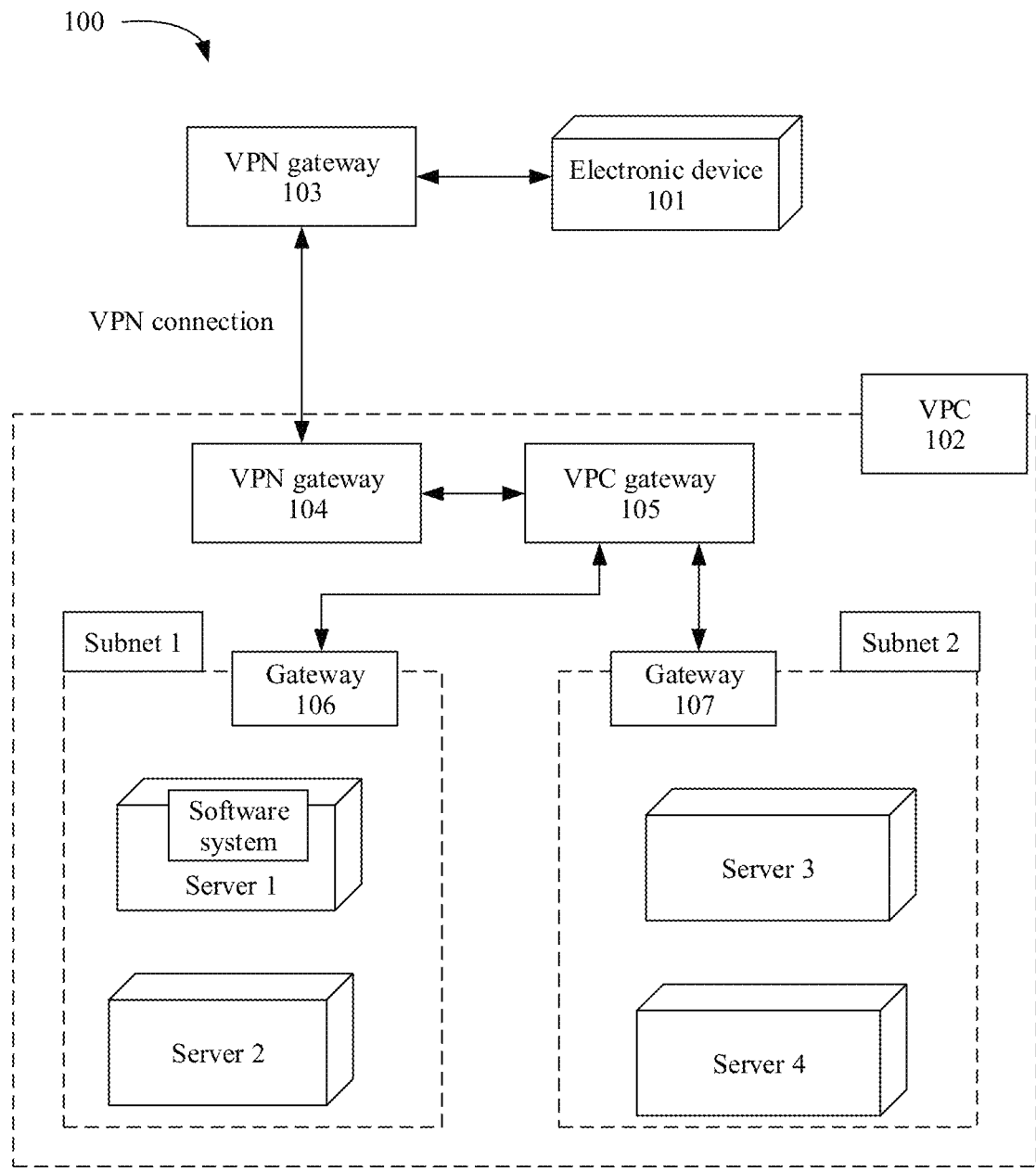
FIG. 1 is a schematic diagram of a communications system applicable to a data transmission method according to an embodiment of this application.

The following describes technical solutions in this application with reference to accompanying drawings.

First, some terms used in this application are briefly introduced.

1. Public cloud: The public cloud is usually a cloud that is provided by a third-party provider and that can be used by a user. The user may access a service through the internet. Currently, common public clouds include, for example, Huawei cloud, Alibaba cloud, and Amazon web service (Amazon web service, AWS).

2. Virtual private network (virtual private network, VPN): Simply speaking, the VPN is a private network built on a public network for encrypted communication. A connection between any two nodes in the entire VPN does not have an end-to-end physical link used by some private networks. Instead, the VPN is a logical network set up on a network platform provided by a public network service provider, and therefore is referred to as a virtual network.

In the embodiments of this application, the VPN may be used to establish a secure and encrypted communications tunnel between an on-cloud system on a virtual private cloud (virtual private cloud, VPC) and an on-premises server. When an on-premises user accesses a resource in the on-cloud system on the VPC by using a local server, or when the on-cloud system on the VPC accesses a resource on the on-premises server, a VPN technology may be used to implement interconnection between the on-premises server and the on-cloud system. Specifically, a VPN connection or a cloud private line may be separately established between the on-cloud system on the VPC and the on-premises server. A specific form of a network connection between the on-cloud system and the on-premises server is not limited in this application.

The VPN connection may be used to construct a secure and reliable encrypted channel between a VPN gateway and a user gateway based on an internet tunneling technology. In current protocols, the VPN connection supports an IP security (IP security, IP sec) VPN protocol.

3. Virtual private cloud (VPC): The VPC is a set of resources that are run on a public cloud and among which a part of public cloud resources are isolated for a user for private use by the user. The VPC may be managed by the public cloud and run on public resources, and can ensure that a resource is isolated for each user. When using the resource, the user is not affected by another user, and feels like using a private cloud of the user. Therefore, the resource is referred to as the virtual private cloud.

The VPC can provide a secure and isolated network environment based on a secure tunneling technology, for example, the foregoing VPN technology. A user can fully control a virtual network of the user, including: creating a subnet, configuring a route table, setting a security group, applying for elastic bandwidth or an elastic IP address, and the like.

A network connection between two VPCs may be referred to as a VPC peering connection.

4. Elastic cloud host: The elastic cloud host may also be referred to as an elastic cloud server (elastic cloud server, ECS). The elastic cloud host may include, for example, a central processing unit (central processing unit, CPU), a network interface, a memory, an image, and a disk, and is a cloud server that can be elastically scaled and obtained on-demand. After an elastic cloud host is successfully created, the elastic cloud host may be used on a cloud just like a local personal computer (personal computer, PC) or a physical server. The elastic cloud host may be combined with another product or service, to implement computation, storage, network, and image installation functions and the like.

5. Software system: In the embodiments of this application, the software system is a system that is run on an elastic cloud host on a VPC. A public cloud may provide an elastic cloud host, and the elastic cloud host runs in a VPC environment. A corresponding application (application, APP) may be deployed in the elastic cloud host to implement a corresponding function. Therefore, the software system, which is on cloud, may also be referred to as an on-cloud application or an on-cloud application system.

Because a branch or a subsidiary of a company in each region can access the software system through a network, the software system is equivalent to a data center of the company. The data center may be, for example, an application center, a service center, or a service center. This is not limited in this application.

6. Subnet (subnet) and network address segment: In the internet, IP addresses may be used to differentiate different hosts. An IP address includes a network identifier and a host identifier that are used to represent a host in a network. Computers corresponding to a same network identifier can "directly" communicate with each other, and computers corresponding to different network identifiers can communicate with each other through gateways. However, such division is not very flexible in some cases. Therefore, an IP network can be divided into smaller networks that are referred to as subnets. In other words, the subnets are obtained through logical division of the IP network. The subnets may be differentiated by using subnet masks. A subnet mask may be used to determine whether any two IP addresses belong to a same subnet.

In the embodiments of this application, one VPC may have one network address segment. Network address segments of different VPCs do not overlap with each other.

A VPC may also be divided into networks at a finer granularity. A network at a finer granularity on a VPC may also be referred to as a subnet. The subnet is a network used to manage a network plane of an elastic cloud host, and may provide IP address management and a domain name system (domain name system, DNS) service. Each subnet may also have one network address segment. Each network address segment may include a plurality of IP addresses. A network address segment of a subnet may be understood as an IP address range of the subnet. In division into the networks at a finer granularity for a VPC, a network address segment of a subnet belongs to a network address segment of the VPC. In other words, a network address segment of a subnet can be considered as a subset of a network address segment of the VPC.

Network address segments of different subnets on a same VPC do not overlap with each other, and elastic cloud servers in all subnets on the same VPC can communicate with each other.

When an elastic cloud host runs on a VPC, one or more network interfaces may be configured on the elastic cloud host. One IP address is configured for each network interface, and the IP address is an IP address belonging to a network address segment of a subnet included in the VPC. It may be understood that an IP address of any network interface on the elastic cloud host belongs to a network address segment of the VPC.

In addition, the subnets may be differentiated by using subnet masks. A subnet mask may be used to determine whether any two IP addresses belong to a same subnet. Subnet masks for any two given IP addresses may be used to determine whether the two IP addresses belong to a same subnet.

7. Private IP address: The private IP address may also be referred to as an internal IP address, or may also be briefly referred to as a private IP address or an internal IP address. The private IP address is an IP address in a local area network. An IP address corresponding to the private IP address is a public IP address. All IP addresses in the embodiments of this application may be private IP addresses.

8. Floating (floating) IP address: In the embodiments of this application, a same IP address may be set for two elastic cloud hosts in a same subnet. When a user accesses the IP address, which elastic cloud host specifically runs may be specified by a system. One of the two elastic cloud hosts may be specified as a primary elastic cloud host, and the other may be specified as a secondary elastic cloud host. Software may set the secondary elastic cloud host to be in a breakdown state when the primary elastic cloud host operates normally, and may start the secondary elastic cloud host when the primary elastic cloud host breaks down. The two elastic cloud hosts share a same floating IP address in the same subnet. For a user, it seems that a same elastic cloud host provides a service. In other words, the user uses the floating IP address, and when any elastic cloud host breaks down, the floating IP address can be automatically switched to the other elastic cloud host. It should be noted that the floating IP address is also a private IP address.

For ease of understanding the embodiments of this application, a communications system applicable to a method provided in the embodiments of this application is first described in detail below with reference to FIG. 1. FIG. 1 is a schematic diagram of a communications system 100 applicable to a data transmission method according to an embodiment of this application. As shown in FIG. 1, the communications system 100 may include one or more electronic devices 101 and one or more VPCs 102.

For example, the electronic device 101 may be an on-premises server, or may be referred to as a local server or a remote server. The electronic device 101 may alternatively be another communications device. This is not limited in this application.

Interconnection may be implemented between VPCs through a VPC peering connection. Interconnection may be implemented between an electronic device and a server on a VPC through a network connection such as a VPN connection. It should be understood that FIG. 1 is merely an example and shows a scenario in which one electronic device is connected to one VPC. However, this should not constitute any limitation on this application. A quantity of VPCs, a quantity of electronic devices, and a connection relationship between a VPC and an electronic device that are included in the communications system are not limited in this application.

Interconnection may be implemented between the electronic device and a server on the VPC through, for example, a VPN connection. Specifically, the VPN connection may be established between an on-premises VPN gateway 103 and an on-cloud VPN gateway 104.

The on-premises VPN gateway 103 may be connected to the electronic device 101 through a router. Although the router is not shown in the figure, a person skilled in the art may understand this connection relationship. The electronic device may be a server running in a subnet. The VPN gateway 103 may be connected to the electronic device 101 through network nodes such as a router and a subnet gateway.

The VPC may include one or more subnets, for example, a subnet 1 and a subnet 2 shown in the figure. Each subnet may correspond to one network address segment. The network address segments do not overlap with each other. The VPC has a corresponding gateway, for example, a VPC gateway 105 shown in the figure. Each subnet on the VPC also has a corresponding gateway, for example, a gateway 106 and a gateway 107 shown in the figure. The gateway in each subnet may be connected to the VPN gateway 104 through the VPC gateway 105.

VPN gateways are egress gateway devices respectively established on a VPC and on premises, for example, the VPN gateway 103 and the VPN gateway 104 shown in the figure. Secure and reliable encrypted communication may be implemented between the VPC and the electronic device or between VPCs through the VPN gateways. In some embodiments, the VPN gateways each may have both a firewall function and a routing function.

The gateway in each subnet is an egress gateway device in the subnet, for example, the gateway 106 and the gateway 107 shown in the figure. Interconnection may be implemented between the subnets through the gateways in the subnets. A VPC gateway is an egress gateway device on a VPC. Interconnection may be implemented between VPCs and between the VPC and an on-premises device through the VPC gateway. In some embodiments, the VPC gateway may have both a firewall function and a routing function.

The server on the VPC may be, for example, an elastic cloud host, or may be referred to as an elastic cloud server. This is not limited in this application.

The server on the VPC may be preconfigured or may be temporarily applied for from a public cloud. There may be one or more servers running on the VPC, for example, a server 1 to a server 4 shown in the figure. It should be understood that the four servers shown in the figure are merely examples, and should not constitute any limitation on this application. A quantity of servers running on the VPC is not limited in this application. In addition, the numbers of the servers in the figure are defined for ease of differentiation, and should also not constitute any limitation on this application.

In this embodiment of this application, a software system may be run on a preconfigured server, for example, the server 1 shown in the figure. The software system may be, for example, a data center of a company. Another server, for example, the server 2 to the server 4 shown in the figure, may be further deployed with different software, for example, a database. This is not limited in this application.

Branches or subsidiaries in different regions or countries expect to access the software system, and therefore expect that one center can be accessed by any quantity of users. However, because telecommunications network operators are different in different regions, there is a high probability that IP network address segments provided by the operators overlap with an IP network address segment of the electronic device. Once IP addresses overlap, a data packet may fail to be correctly sent, affecting user experience, or even causing a huge economic loss to a user.

Figure 2:
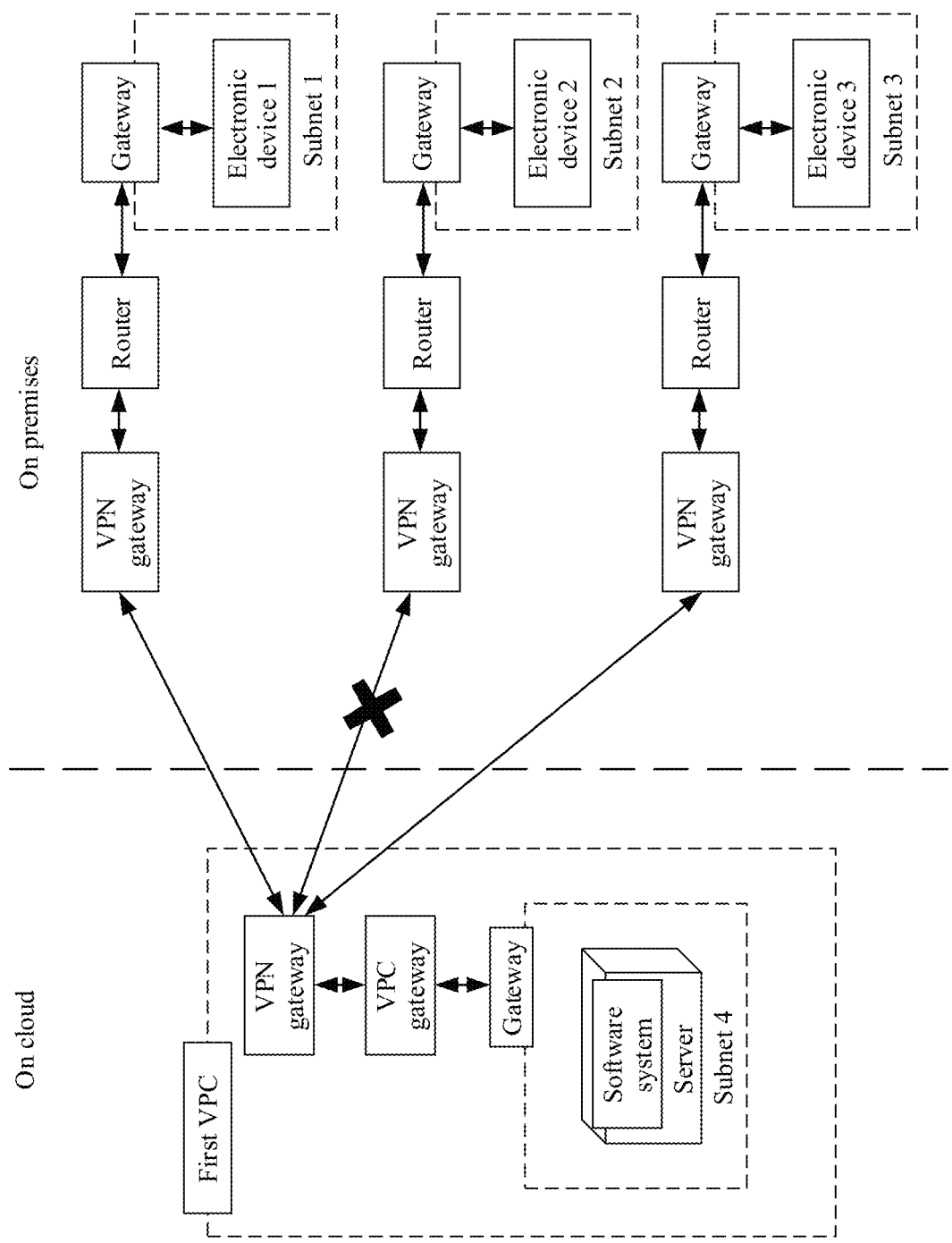
FIG. 2 is a schematic diagram of a software system that is on a server and that is accessed by a plurality of electronic device.

FIG. 2 shows an example in which a plurality of electronic devices access a software system on a same server. As shown in FIG. 2, a subnet 1 in which an electronic device 1 is located has a network address segment 1, a subnet 2 in which an electronic device 2 is located has a network address segment 2, a subnet 3 in which an electronic device 3 is located has a network address segment 3, and a subnet in which the server that runs the software system is located is also a subnet 2 and also has a network address segment 2. In other words, the network address segment of the subnet 2 in which the electronic device 2 is located overlaps with the network address segment of the subnet 2 in which the software system is located. If the electronic device 2 is directly connected to the software system through a VPN connection, when a data packet is transmitted between the electronic device 2 and the software system, one destination address in the data packet may correspond to two nodes. In other words, one destination address does not correspond to a unique node. Consequently, the data packet may be incorrectly forwarded, and neither the electronic device 2 nor the software system can correctly receive the data packet from the peer end.

Therefore, a new VPC and a new data center may be created, to implement interconnection. For example, a new VPC is created for the electronic device 2, and a subnet on the newly created VPC may have a network address segment 4, to avoid overlapping between the network address segment of the subnet in which the software system is located and the network address segment of the subnet in which the electronic device 2 is located. It may be understood that, because there are a large quantity of electronic devices, there is a high probability that network address segment overlapping occurs between the plurality of electronic devices and the software system. If a same method is used to process network address segment overlapping each time, costs may be very high, and a deployment period may be relatively long.

In view of this, this application provides a data transmission method, so that one center can be accessed by any quantity of users, to ensure correct transmission of a data packet. In addition, implementation costs are relatively low, and a deployment period is relatively short.

The method provided in the embodiments of this application is described in detail below with reference to the accompanying drawings.

It should be noted that the method provided in the embodiments of this application may be performed by a server, and may be specifically implemented by software by executing corresponding instructions, where the software is deployed on the server. The software may be, for example, software deployed on a virtual machine created on the server. The server may be, for example, a server provided on a VPC, or the server may be a server running on the VPC. A software system is run on the VPC. For example, the software system may be deployed on the server, or may be deployed on another server provided on the VPC. This is not limited in this application.

In an implementation, the server is an elastic cloud host, or referred to as an elastic cloud server.

For ease of differentiation and description below, a server used to perform the method provided in the embodiments of this application is referred to as a first server, and a server that runs the software system is referred to as a target server. The first server and the target server may run on a same VPC, and the VPC may be, for example, referred to as a first VPC. An electronic device that accesses the software system may be referred to as a first electronic device. The first electronic device may be the foregoing listed on-premises server, or may be another communications device. This is not limited in this application.

Figure 3:
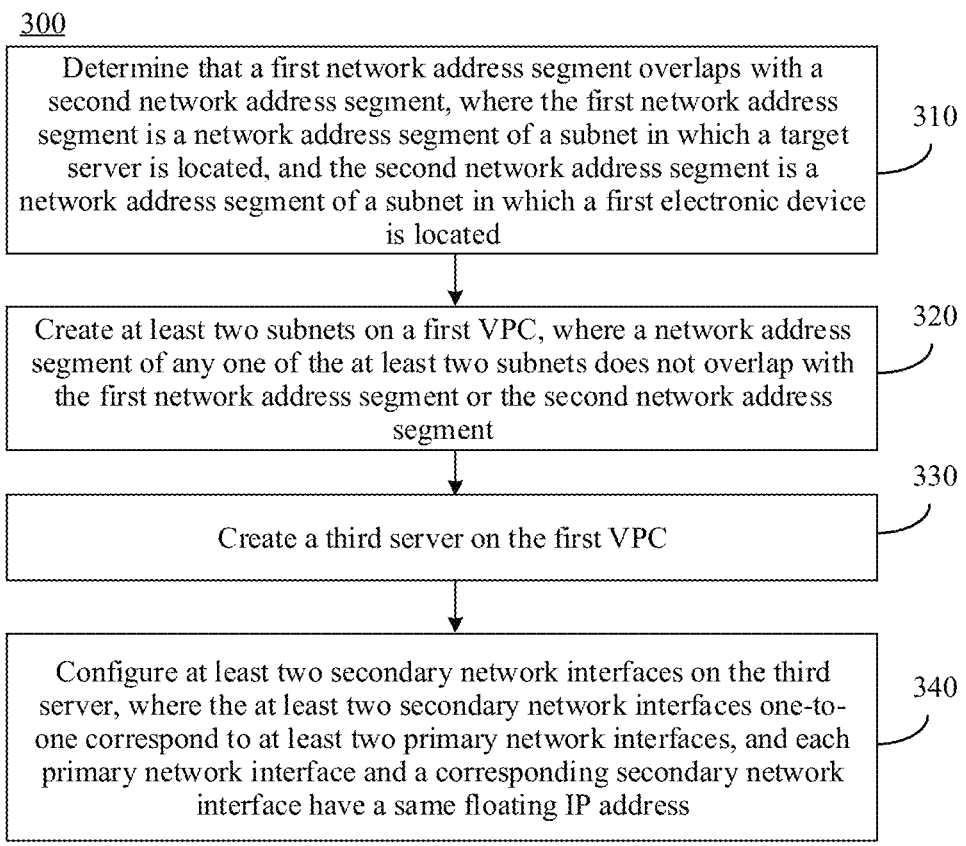
FIG. 3 is a schematic flowchart of a data transmission method according to an embodiment of this application.

FIG. 3 is a schematic flowchart of a data transmission method 300 according to an embodiment of this application. As shown in FIG. 3, the method 300 may include step 310 to step 340.

Step 310: Determine that a first network address segment overlaps with a second network address segment.

The first network address segment may be a network address segment of a subnet in which a target server is located. For example, the subnet is referred to as a first subnet, and the first subnet has the first network address segment. A software system is run on the target server. An on-premises electronic device may access the software system based on an IP address of a network interface configured on the target server. For ease of differentiation and description, the network interface that is configured on the target server and that may be used to access the software system is referred to as a first network interface.

It should be understood that the network interface may be, for example, a network interface or other software and/or hardware having a function of a network interface. This is not limited in this application.

As described above, the target server runs on a first VPC, and therefore, the first network address segment belongs to a network address segment of the first VPC.

The second network address segment is a network address segment of a subnet in which a first electronic device is located. For example, the subnet may be referred to as a second subnet, and the second subnet has the second network address segment. In this embodiment of this application, the first electronic device expects to access the software system on the target server through a network connection. In other words, the first electronic device expects to be connected to the software system.

For example, the subnet 2 on the first VPC shown in FIG. 2 is an example of the first subnet, and the network address segment 2 of the subnet 2 is an example of the first network address segment. The electronic device 1, the electronic device 2, and the electronic device 3 shown in FIG. 2 are several examples of the first electronic device. The on-premises subnet 1, subnet 2, and subnet 3 shown in FIG. 2 are several examples of the second subnet, and the corresponding network address segment 1, network address segment 2, and network address segment 3 are several examples of the second network address segment.

Herein, that the target server is located in the first subnet may mean that an IP address of the target server belongs to the network address segment of the first subnet, or that the first network address segment includes an IP address of the target server. The IP address of the target server may be specifically an IP address of a network interface configured on the target server.

That the first electronic device is located in the second subnet may mean that an IP address of the first electronic device belongs to the second network address segment of the second subnet, or that the second network address segment includes an IP address of the first electronic device. The IP address of the first electronic device may be specifically an IP address of a network interface of the first electronic device. For brevity, descriptions of a same or similar case are omitted below.

In some embodiments, a first server may obtain the first network address segment and the second network address segment in advance. For example, the first network address segment may be input by a staff member into the first server in advance. The second network address segment may also be input by the staff member into the first server in advance. Alternatively, based on a newly added electronic device of a user accesses the software system, a dialog box may be temporarily displayed in a user interface, to facilitate input of the staff member.

An example of a network address segment is input as follows: 192.168.0.0/16, where 192.168.0.0 is an IP address, and 16 is a subnet mask. The IP address is an IP address starting with "0", indicating that the IP address may be used together with a subsequent subnet mask to determine a network address segment. 192.168.*.* is a default private IP address. Currently, the default private IP address may alternatively be, for example, 172.16.*.*. This is not limited in this application.

It should be understood that the IP address may be a private IP address, or may be a public IP address. This is not limited in this application. In addition, for a specific method for determining a network address segment based on an IP address and a subnet mask, details of the specific method are omitted in this application for brevity.

In some embodiments, after obtaining the first network address segment and the second network address segment, the first server may determine whether the second network address segment overlaps with the first network address segment.

Specifically, each network address segment may be a set of a plurality of IP addresses. Determining whether the first network address segment overlaps with the second network address segment is determining whether an IP address in the first network address segment is the same as an IP address in the second network address segment, in other words, whether there is an intersection of a set of IP addresses in the first network address segment and a set of IP addresses in the second network address segment. If there is no IP address in the first network address segment that is the same as an IP address in the second network address segment, in other words, the intersection is an empty set, it may be considered that the first network address segment does not overlap with the second network address segment. On the contrary, if there is an IP address in the first network address segment that is the same as an IP address in the second network address segment, in other words, the intersection is not empty, it may be considered that the first network address segment overlaps with the second network address segment. The first network address segment may partially or completely overlap with the second network address segment. This is not limited in this application.

If the second network address segment does not overlap with the first network address segment, the first server may directly establish a VPN connection between a VPN gateway of the first electronic device and a VPN gateway on the first VPC. A specific implementation process for establishing the VPN connection may be the same as other approaches. For brevity, details of the process are omitted herein.

Herein, it should be noted that, that the first server establishes a VPN connection between a VPN gateway of the first electronic device and a VPN gateway on the VPC may be specifically implemented by invoking an application programming interface (application programming interface, API). The API interface may be invoked, to run a pre-compiled program; or related software, for example, VPN software, may be invoked, to automatically create the VPN connection. In addition, the API interface may be, for example, provided on a public cloud, and the first server running on the first VPC may implement different functions by invoking corresponding API interfaces.

It should be further noted that the VPN gateway of the first electronic device does not belong to the first electronic device. The VPN gateway of the first electronic device may also serve as a VPN gateway of another electronic device, and is connected to the VPN gateway on the first VPC through a VPN connection. The VPN gateway of the first electronic device may be understood as an on-premises VPN gateway.

If the second network address segment overlaps with the first network address segment, the following step may be performed. Step 320: Create at least two subnets on the first VPC, where a network address segment of any one of the at least two subnets does not overlap with the first network address segment or the second network address segment.

Network interfaces in the at least two subnets are used to sequentially forward a data packet being transmitted by the target server to the first electronic device, so that the data packet is forwarded for at least two times during transmission of the data packet. More specifically, the network interfaces in the at least two subnets are used to sequentially forward the data packet being transmitted by the software system on the target server to the first electronic device, so that the data packet is forwarded for at least two times during transmission of the data packet.

Correspondingly, the network interfaces in the at least two subnets are used to sequentially forward a data packet being transmitted by the first electronic device to the target server, so that the data packet is forwarded for at least two times during transmission of the data packet. More specifically, the network interfaces in the at least two subnets are used to sequentially forward the data packet being transmitted by the first electronic device to the software system that is run on the target server, so that the data packet is forwarded for at least two times during transmission of the data packet.

For ease of understanding and description, the following describes, in detail with reference to the scenario shown in FIG. 2, the specific data transmission method provided in this application. As described above, the on-cloud subnet 2 (namely, an example of the first subnet) and the on-premises subnet 2 (namely, an example of the second subnet) that are shown in FIG. 2 each have the network address segment 2. In other words, network address segment overlapping occurs between the on-cloud subnet 2 and the on-premises subnet 2.

Figure 4:
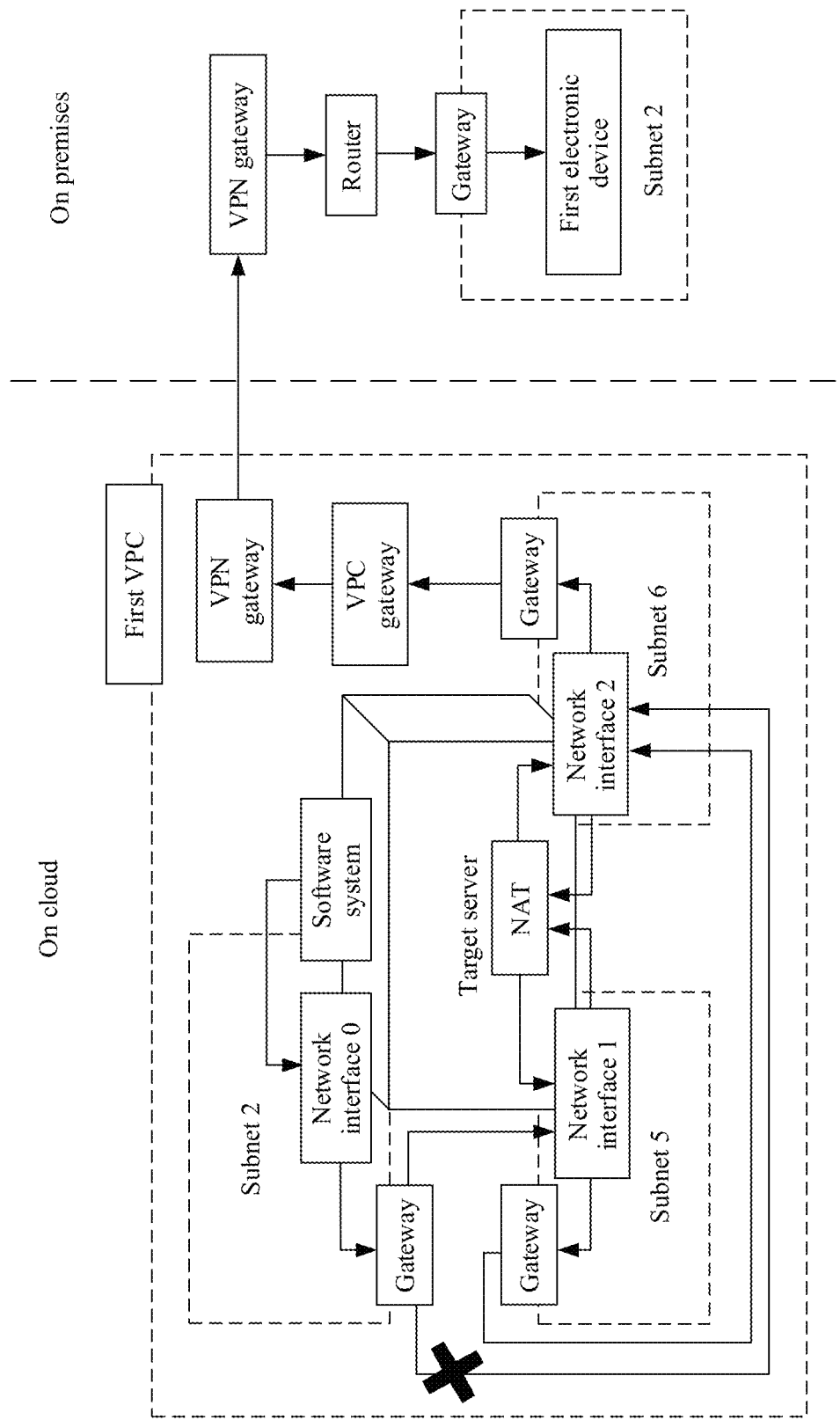
FIG. 4 and FIG. 5 each are a schematic diagram of data transmission between a software system that is run on a target server on a first VPC and a first electronic device according to an embodiment of this application.
Figure 5:
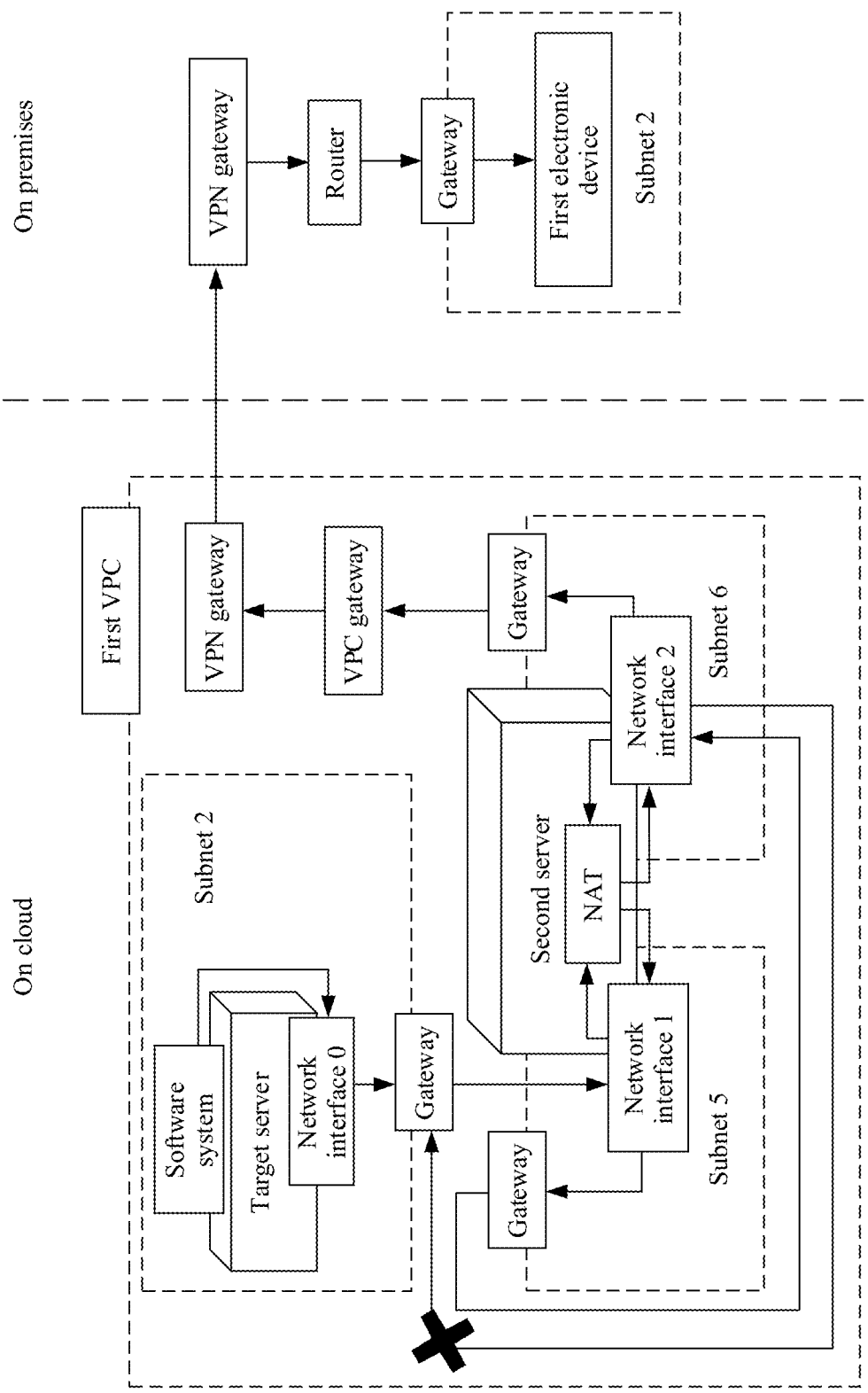

FIG. 4 and FIG. 5 each are a schematic diagram of data transmission between a software system that is run on a target server on a first VPC and a first electronic device. As shown in FIG. 4, the first server creates two subnets on the first VPC. For ease of differentiation and description below, the two newly created subnets may be referred to as, for example, a subnet 5 and a subnet 6 (namely, an example of the at least two subnets). A network address segment of the subnet 5 may be referred to as, for example, a network address segment 5, and a network address segment of the subnet 6 may be referred to as, for example, a network address segment 6. In this embodiment of this application, neither the network address segment 5 nor the network address segment 6 overlaps with the network address segment 2. Therefore, the subnet 5 and the subnet 6 may be connected between the first subnet (for example, the on-cloud subnet 2 shown in FIG. 4) in which the target server is located and the second subnet (for example, the on-premises subnet 2 shown in FIG. 4) in which the first electronic device is located. Interconnection may be implemented between the software system and the first electronic device through the two newly created subnets. Arrows in FIG. 4 or FIG. 5 show an example of a path for sending a data packet by the software system to the first electronic device. A data packet forwarding path is to be described below with reference to the accompanying drawings, and therefore details of the specific content is omitted herein.

It should be understood that the figure is merely an example and schematically shows two newly created subnets. However, this should not constitute any limitation on this application. There may be two or more subnets that are newly created.

After the at least two subnets are created, a route for transmitting a data packet between the first electronic device and the software system may be determined. For example, the route may be determined by the first server based on an interconnection relationship with the newly created subnets, or may be manually input by a staff member. This is not limited in this application. For example, the determined route may be stored in a network interface in each subnet in a form of a routing table, so that each subnet forwards a data packet based on the predetermined route after receiving the data packet.

As shown in the figure, a data packet sent by the software system to the first electronic device may arrive at the first electronic device after being sequentially forwarded through a network interface in the subnet 5 and a network interface in the subnet 6, and a data packet sent by the first electronic device to the software system may arrive at the software system after being sequentially forwarded through the network interface in the subnet 6 and the network interface in the subnet 5. In addition, a security group policy may be set, so that a gateway in the first subnet (for example, the on-cloud subnet 2 in the figure) is prohibited from receiving a data packet from the subnet 6. For ease of understanding, the figure shows an example in which a network interface 2 in the subnet 6 is disconnected from the gateway in the on-cloud subnet 2. For brevity, descriptions of a same or similar case are omitted below.

It should be understood that the foregoing is merely an example, and describes the examples of the path for sending the data packet by the software system to the first electronic device and the path for sending the data packet by the first electronic device to the software system. However, this should not constitute any limitation on this application. For example, alternatively, the data packet sent by the software system to the first electronic device may arrive at the first electronic device after being sequentially forwarded through the network interface in the subnet 6 and the network interface in the subnet 5, and the data packet sent by the first electronic device to the software system may arrive at the software system after being sequentially forwarded through the network interface in the subnet 5 and the network interface in the subnet 6. This is not limited in this application.

It should be noted that, in this embodiment of this application, that the first server creates at least two subnets on the first VPC may be specifically implemented by the first server by invoking an API interface. The API interface may be invoked, to run a pre-compiled program; or related software may be invoked, to automatically create the subnets. In a process for creating the subnets, the API interface may present a dialog box to the staff member in the user interface, so that the staff member inputs a network address segment of each of the at least two subnets. The network address segments of the at least two subnets may alternatively be determined by the first server based on a pre-obtained network address segment of each subnet (for example, the first subnet and the second subnet). This is not limited in this application.

In some embodiments, the data packet is forwarded through each of at least two network interfaces after IP address translation is performed, the at least two network interfaces one-to-one correspond to the at least two subnets, and an IP address of each network interface belongs to a corresponding subnet.

In other words, a network address segment of each subnet includes an IP address of a corresponding network interface. The network interface may forward a received data packet after performing network address translation (network address translation, NAT) on the data packet. The network address may be, for example, an IP address.

For example, after IP address translation is performed by the at least two network interfaces for at least two times, the data packet from the software system may arrive at the first electronic device after being sequentially forwarded by data packet forwarding modules in the at least two subnets, and/or the data packet from the first electronic device may arrive at the software system after being sequentially forwarded by the data packet forwarding modules in the at least two subnets.

It should be understood that the network address translation may specifically include destination network address translation (destination network address translation, DNAT) and source network address translation (source network address translation, SNAT). The DNAT may be used to translate a destination address for receiving the data packet, for example, a destination IP address; and the SNAT may be used to translate a source address of the data packet, for example, a source IP address.

Each of the at least two network interfaces may perform the network address translation on the received data packet based on the foregoing predetermined route. Specifically, a function of the network address translation may be jointly implemented by DNAT software and SNAT software, or may be implemented by NAT software, or may be implemented by other software or hardware that can implement a same or similar function. This is not limited in this application. In the following, for ease of description, a module for implementing a network address translation function is referred to as a NAT module.

After receiving a data packet, each network interface may determine a destination IP address of the data packet based on a predetermined route, and determine a source IP address of the data packet based on an IP address of a node that sends the data packet. After determining the destination IP address and the source IP address, the network interface may input the destination IP address and the source IP address into the NAT, and the NAT performs IP address translation on the data packet. For each subnet, the NAT may be deployed on a server in the subnet, so that the server in the subnet performs destination IP address translation on a data packet when receiving the data packet, and then forwards the data packet. In addition, when receiving the data packet, the server in the subnet may further perform source IP address translation on the data packet, to determine a return route.

In some embodiments, the at least two network interfaces are configured on a same server.

When the at least two network interfaces are configured on the same server, the at least two subnets may share one NAT module for IP address translation, or each of the at least two subnets may use an independent NAT for IP address translation.

In an embodiment, the at least two network interfaces are configured on the target server.

In some embodiments, the method further includes: The first server configures the at least two network interfaces on the target server. In other words, at least two network interfaces may be added to the first server, to correspond to the at least two subnets. An IP address of each network interface belongs to one of the at least two network interfaces. When receiving a data packet, a network interface in each of the at least two subnets may send the data packet to the NAT for performing IP address translation once, and a data packet that has undergone IP address translation is returned to the network interface. The network interface may forward the data packet to a next destination IP address based on a destination IP address obtained after IP address translation is performed.

As described above, in addition to the network interface (for example, referred to as the first network interface) that is originally configured on the target server, the at least two network interfaces are added to the target server, to correspond to the at least two newly created subnets. In some embodiments, the method further includes: adding the at least two network interfaces to the target server, where IP addresses of the at least two network interfaces respectively belong to the at least two subnets. In other words, IP addresses of the at least two network interfaces one-to-one correspond to the at least two subnets.

Then, considering the first network interface originally configured on the target server, there are at least three network interfaces that are configured on the target server. IP addresses of the at least three network interfaces respectively belong to at least three subnets, and network address segments of the at least three subnets do not overlap with each other. As shown in FIG. 4, three network interfaces may be configured on the target server, for example, a network interface 0 (namely, an example of the first network interface), and a network interface 1 and a network interface 2 (namely, an example of the at least two network interfaces) that are shown in the figure. The three network interfaces may respectively belong to three different subnets: the subnet 2, the subnet 5, and the subnet 6.

In another embodiment, the at least two network interfaces are configured on a second server.

In some embodiments, the method further includes: creating the second server on the first VPC; and configuring the at least two network interfaces on the second server. IP addresses of the at least two network interfaces belong to the at least two newly created subnets.

The second server may be another server independent of the target server, and there is a network connection relationship between the second server and the target server. If the at least two network interfaces are configured on the second server, the data packet sent by the target server may arrive at the first electronic device after being forwarded through the at least two network interfaces on the second server, or the data packet sent by the first electronic device may arrive at the target server after being forwarded through the at least two network interfaces on the second server.

As shown in FIG. 5, two network interfaces may be configured on the second server, and the two network interfaces may respectively belong to two different subnets: a subnet 5 and a subnet 6. A specific process in which a network interface performs IP address translation and forwards a data packet is similar to that described above. For brevity, details are not described herein again.

It can be learned from the examples in FIG. 4 and FIG. 5 that the at least two newly created subnets and the first subnet (the subnet 2 shown in the figures) may correspond to a same server, or may correspond to different servers. A person skilled in the art may understand that, if a network interface is added to the target server, the target server is thus restarted. Therefore, whether to add a network interface to the target server or create a new server on the target server, and whether two or more network interfaces are configured on the newly created server (for example, the second server) to forward a data packet may be determined based on a user, to implement interconnection between the first electronic device and the software system.

It should be understood that the second server may be a server temporarily created based on a user, or may be a server originally running on the first VPC. If there are a plurality of servers originally running on the first VPC, one of the servers may be considered to serve as the second server, and the at least two network interfaces corresponding to the at least two subnets are directly configured on the server. This is not limited in this application.

It should be further understood that, that a same server runs in the at least two newly created subnets (for example, the subnet 5 and the subnet 6 in FIG. 4 or FIG. 5) is merely a possible implementation, and should not constitute any limitation on this application. Alternatively, there may be one server running in each newly created subnet. In other words, a quantity of the second servers is not limited to one, and there may be at least two second servers. This is not limited in this application. Correspondingly, the network interfaces in the at least two subnets may share one NAT module, or the network interfaces in the subnets use respective NAT modules. This is not limited in this application.

FIG. 4 and FIG. 5 are still used as examples below to further describe the route and the forwarding process for transmitting a data packet between the software system and the first electronic device. It should be noted that, for ease of understanding, the figure shows a data packet forwarding path for sending a data packet by the first electronic device to the software system. A data packet forwarding path for sending a data packet by the software system to the first electronic device is opposite, and for brevity, this data packet forwarding path is not shown in the figure. However, a person skilled in the art may obtain the corresponding forwarding path based on the following descriptions.

When the software system sends a data packet to the first electronic device, the software system may set, through the first network interface (for example, the network interface 0 in the figure) on the target server, a destination address of the data packet to an IP address that is of a network interface and that belongs to the subnet 5. Herein, for ease of differentiation and description, the network interface in the subnet 5 is referred to as a network interface 1, and the IP address of the network interface 1 is referred to as an IP address 1. The network interface 1 may be, for example, a newly added network interface on the target server shown in FIG. 4, or may be a network interface on another server shown in FIG. 5. This is not limited in this application.

The data packet may be forwarded to a gateway in the subnet 5 through a network interface 0 on the target server on which the software system is run, and then forwarded by the gateway in the subnet 5 to the network interface 1. The network interface 1 may set a destination address of the data packet to an IP address that is of a network interface and that belongs to the subnet 6. In other words, network address translation performed on the data packet for the first time is complete. Herein, for ease of differentiation and description, the network interface in the subnet 6 is referred to as a network interface 2, and the IP address of the network interface 2 is referred to as an IP address 2. The network interface 2 may be, for example, another newly added network interface on the target server shown in FIG. 4, or may be a network interface on another server shown in FIG. 5. This is not limited in this application.

The data packet may be forwarded to a gateway in the subnet 6 through the network interface 1, and then forwarded by the gateway in the subnet 6 to the network interface 2. The network interface 2 may set a destination address of the data packet to the IP address of the first electronic device. In other words, network address translation performed on the data packet for the second time is complete. Herein, for ease of differentiation and description, the IP address of the first electronic device is referred to as an IP address 3. The IP address 3 is also an IP address of a gateway in the subnet 2 in which the first electronic device is located.

The data packet may be forwarded to the gateway in the on-premises subnet 2 through the network interface 2, and then forwarded by the gateway in the on-premises subnet 2 to the first electronic device. When the data packet is forwarded to the gateway in the on-premises subnet 2 through the network interface 2, the data packet may, for example, sequentially pass through network nodes such as the gateway in the on-cloud subnet 6, a VPC gateway, an on-cloud VPN gateway, a VPN connection, an on-premises VPN gateway, and an on-premises router. When on-cloud and on-premises transmission of the data packet is performed, a path that the data packet passes through may be the same as that in other approaches. For brevity, details are not described herein. Descriptions of a same or similar case are omitted below.

Therefore, the data packet sent by the software system can reach the first electronic device after the network address translation is performed on the data packet for two times. It should be understood that the figure is merely an example, and does not show each node that the data packet passes through. However, this should not constitute any limitation on this application. A person skilled in the art may understand that the data packet sent by the software system can reach the first electronic device after the network address translation is performed on the data packet for two times.

When the first electronic device sends a data packet to the software system, the first electronic device may set, through the network interface, a destination address of the data packet to an IP address that is of a network interface and that belongs to the subnet 6. As described above, the network interface belonging to the subnet 6 is referred to as a network interface 2, and the IP address of the network interface 2 is referred to as an IP address 2. The network interface 2 may be a newly added network interface on the target server shown in FIG. 4, or may be a network interface on another server shown in FIG. 5. This is not limited in this application.

The data packet may be forwarded to a gateway in the subnet 6 through a network interface in the subnet 2 in which the first electronic device is located, and then forwarded by the gateway in the subnet 6 to the network interface 2. The network interface 2 may set a destination address of the data packet to an IP address that is of a network interface and that belongs to the subnet 5. In other words, network address translation performed on the data packet for the first time is complete. As described above, the network interface belonging to the subnet 5 is referred to as a network interface 1, and the IP address of the network interface 1 is referred to as an IP address 1. The network interface 1 may be a newly added network interface on the target server shown in FIG. 4, or may be a network interface on another server shown in FIG. 5. This is not limited in this application.

The data packet may be forwarded to a gateway in the subnet 5 through the network interface 2, and then forwarded by the gateway in the subnet 5 to the network interface 1. The network interface 1 may set a destination address of the data packet to an IP address of a network interface 0. In other words, network address translation performed on the data packet for the second time is complete. As described above, an IP address of the network interface 0 is the IP address of the target server on which the software system is run.

Therefore, the data packet sent by the first electronic device can reach the software system after the network address translation is performed on the data packet for two times. It should be understood that the figure is merely an example, and does not show each node that the data packet passes through. However, this should not constitute any limitation on this application. A person skilled in the art may understand that the data packet sent by the first electronic device can reach the software system after the network address translation is performed on the data packet for two times.

It should be further understood that the foregoing describes, with reference to FIG. 4 and FIG. 5, the data packet forwarding process by using an example in which two subnets are newly created. It may be understood that, when a quantity of newly created subnets is N (N≥2, and N is an integer), destination address translation is also performed on the data packet for N times.

Based on the foregoing technical solution, when network address segment overlapping occurs between the first electronic device and the software system, the at least two subnets are created on the first VPC, to implement interconnection between the first electronic device and the software system. Because the network address segment of any one of the at least two subnets does not overlap with the network address segment of the first electronic device or the network address segment to which the IP address of the first network interface belongs, a unique destination IP address can be found for a data packet in a process for transmitting the data packet. In this way, the data packet can be correctly transmitted between the first electronic device and the software system.

To improve reliability, a primary network interface and a secondary network interface may be further configured for the at least two subnets. The primary network interface and the secondary network interface may be configured on different servers. However, a same floating IP address may be configured for the primary network interface and the secondary network interface in a same subnet.

In some embodiments, the at least two network interfaces are primary network interfaces. The method further includes the following steps:

Step 330: The first server creates a third server on the first VPC.

Step 340: The first server configures at least two secondary network interfaces on the third server, where the at least two secondary network interfaces one-to-one correspond to the at least two primary network interfaces, a network address segment to which an IP address of each primary network interface belongs is the same as a network address segment to which an IP address of a corresponding secondary network interface belongs, and each primary network interface and a corresponding secondary network interface have a same floating IP address.

In some embodiments, the method further includes: The first server allocates a same floating IP address to each primary network interface and a corresponding secondary network interface.

Specifically, IP addresses of the at least two secondary network interfaces may correspond to the at least two subnets. An IP address of each secondary network interface belongs to a network address segment of a corresponding subnet. Therefore, both the target server (or the second server) and the third server run in each of the at least two newly created subnets. The target server (or the second server) may provide a primary network interface, and the third server may provide a secondary network interface. In other words, the first server may configure one secondary network interface for each primary network interface.

The first server may set one floating IP address for a primary network interface and a secondary network interface in each subnet. The floating IP address may be understood as an external IP address of the primary network interface and the secondary network interface. In other words, one primary network interface and a corresponding secondary network interface may share a same floating IP address.

Figure 6:
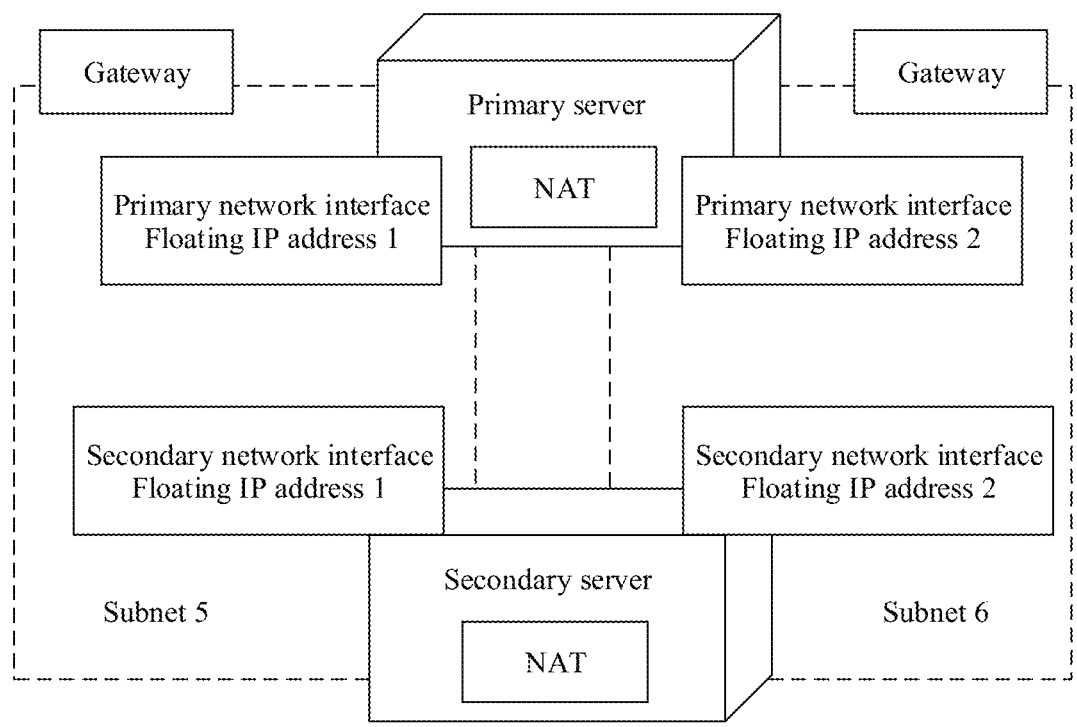
FIG. 6 is a schematic diagram of a primary server and a secondary server according to an embodiment of this application.

It should be noted that the floating IP address still belongs to the subnet. As shown in FIG. 6, a primary network interface and a secondary network interface in the subnet 5 may use a same floating IP address, and the floating IP address belongs to a network address segment of the subnet 5. A primary network interface and a secondary network interface in the subnet 6 may use another floating IP address, and the floating IP address belongs to a network address segment of the subnet 6.

Corresponding to a primary network interface, a server on which the primary network interface is configured (namely, the target server or the second server) may be referred to as a primary server; and corresponding to a secondary network interface, a server on which the secondary network interface is configured (namely, the third server) may be referred to as a secondary server. When a user accesses a floating IP address, if the primary server operates normally, the secondary server may be set to being in a breakdown state; and if the primary server breaks down, the secondary server is set to operating normally. In other words, the user uses the floating IP address, and when any server breaks down, the floating IP address can be automatically switched to the other server. Therefore, when the user accesses the floating IP address, there is a server that can operate normally to provide a service for the user. It seems that a same server operates. In this way, high availability in a primary/secondary mode is implemented.

One primary network interface and one secondary network interface may be configured in each of the at least two newly created subnets. In other words, each newly created subnet has one floating IP address. As described above, one server may run in each subnet, and one primary network interface and one secondary network interface are configured in each subnet. Therefore, one primary server and one secondary server may run in each subnet.

A same server may run in the at least two newly created subnets. Therefore, when the high availability in the primary/secondary mode is considered, a same primary server may run in the at least two newly created subnets, and a same secondary server may also run in the at least two newly created subnets. In this way, a high-reliability service is implemented, and resource utilization is improved.

It should be understood that the third server may be a server temporarily created based on a user, or may be a server originally running on the first VPC. If there are a plurality of servers originally running on the first VPC, one of the servers may be considered to serve as the third server, and the at least two network interfaces corresponding to the at least two subnets are directly configured on the server. This is not limited in this application.

FIG. 6 shows an example of a primary server and a secondary server. The primary server may be, for example, the target server or the second server described above. FIG. 6 shows an example in which the target server is the primary server. The secondary server may be a newly created server. FIG. 6 shows an example in which the third server is the secondary server.

In the subnet 5, at least two network interfaces are respectively configured for the primary server and the secondary server, and a floating IP address of a network interface of the primary server and a floating IP address of a network interface of the secondary server may be, for example, referred to as floating IP addresses 1. In the subnet 6, a floating IP address of a network interface of the primary server and a floating IP address of a network interface of the secondary server may be, for example, referred to as floating IP addresses 2. In this case, the floating IP addresses 1 may belong to a network address segment of the subnet 5, and the floating IP addresses 2 may belong to a network address segment of the subnet 6. It may be learned that the floating IP address of the network interface of the primary server in the subnet 5 is the same as the floating IP address of the network interface of the secondary server in the subnet 5, and the floating IP address of the network interface of the primary server in the subnet 6 is the same as the floating IP address of the network interface of the secondary server in the subnet 6.

It should be understood that the figure is merely an example, and shows a case in which the same primary server and the same secondary server run on the two subnets. However, this should not constitute any limitation on this application. A person skilled in the art may understand that the primary server and the secondary server may be specified by a system. For example, in this embodiment of this application, the primary server and the secondary server may be specified by the first server or the staff member. The primary server and the secondary server are merely two relative concepts, and same hardware and software resources may be configured for the primary server and the secondary server, to provide a same service. Therefore, for one of the at least two newly created subnets, a specified primary server may also be a secondary server of the other subnet. For example, the primary server in the subnet 6 may be the secondary server in the subnet 5, and the primary server in the subnet 5 may be the secondary server in the subnet 6.

It should be further understood that the figure is merely an example, and shows a floating IP address of each network interface. However, this should not constitute any limitation on this application. For example, in an implementation, the first server may set three private IP addresses for a primary network interface and a secondary network interface in a same subnet. One of the private IP addresses may be used as a floating IP address, and the other two private IP addresses may be respectively used as an IP address of the primary network interface and an IP address of the secondary network interface.

In addition to network address segment overlapping that occurs between the electronic device and the software system, network address segment overlapping may also occur between electronic devices. This application also provides a corresponding technical solution to network address segment overlapping that occurs between the electronic devices.

In some embodiments, the method further includes: determining that a third network address segment overlaps with the first network address segment.

The third network address segment may be a network address segment of an electronic device that expects to access the software system. For ease of differentiation and description, the electronic device is referred to as a second electronic device, a subnet in which the electronic device is located is referred to as a third subnet, and a network address segment of the third subnet is the third network address segment.

In some embodiments, the method further includes: determining whether the third network address segment overlaps with the second network address segment.

When the third network address segment does not overlap with the second network address segment, in some embodiments, the method further includes: establishing a VPN connection between a VPN gateway of the second electronic device and the VPN gateway on the first VPC. Details of a specific implementation process for establishing the VPN connection are omitted herein for brevity.

When the third network address segment overlaps with the second network address segment, in some embodiments, the method further includes: creating a second VPC, and creating at least two subnets on the second VPC. There is a communication connection between the second VPC and the first VPC, and network address segments of the at least two subnets created on the second VPC do not overlap with the first network address segment or the third network address segment.

As described above, network address segments of the two VPCs do not overlap with each other. Therefore, network address segments of the at least two subnets created on the second VPC definitely do not overlap with a network address segment of any subnet on the first VPC. In addition, network address segments of the at least two subnets created on the second VPC do not overlap with the third network address segment either. Therefore, network interfaces in the at least two subnets may be used to sequentially forward a data packet being transmitted by the target server to the second electronic device, so that the data packet is forwarded for at least two times during transmission of the data packet.

It should be noted that the first server may also create the second VPC and create the subnets on the second VPC by invoking an API. As described above, the API interface may be provided on the public cloud. The first server may invoke the corresponding API interface to create the second VPC and create the at least two subnets on the second VPC.

In some embodiments, the data packet is forwarded through each of the at least two network interfaces after IP address translation is performed, the at least two network interfaces one-to-one correspond to the at least two subnets on the second VPC, and an IP address of each network interface belongs to a corresponding subnet.

Correspondingly, the network interfaces in the at least two subnets may be used to sequentially forward a data packet being transmitted by the second electronic device to the target server, so that the data packet is forwarded for at least two times during transmission of the data packet.

In some embodiments, the data packet is forwarded through each of the at least two network interfaces after IP address translation is performed, the at least two network interfaces one-to-one correspond to the at least two subnets on the second VPC, and an IP address of each network interface belongs to a corresponding subnet.

As described above, the network interfaces in the at least two subnets may share a same NAT for IP address translation, or may use respective NAT modules for IP address translation. This is not limited in this application.

Figure 7:
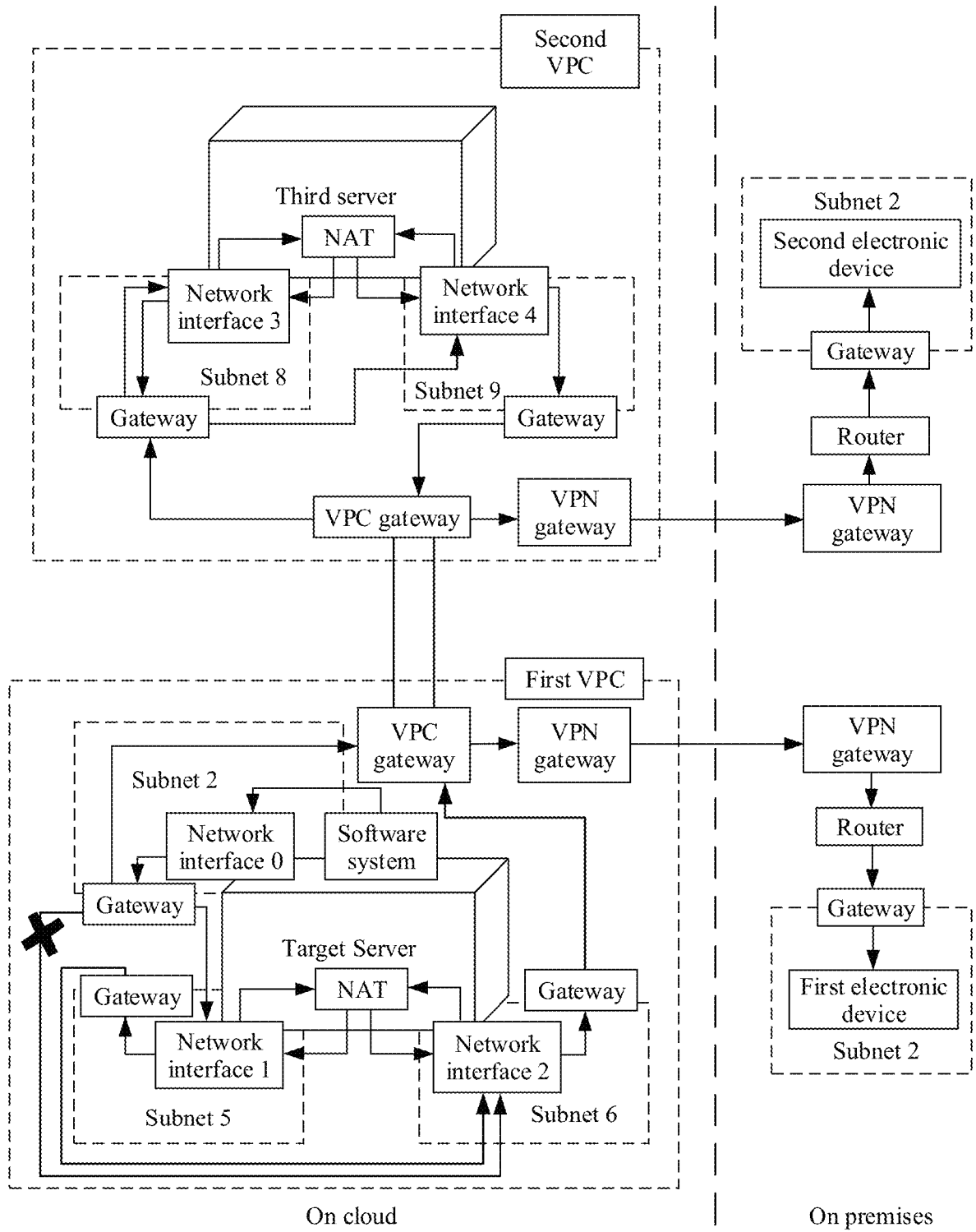
FIG. 7 is a schematic diagram of data transmission between a first electronic device and a software system that is run on a target server and between a second electronic device and the software system according to an embodiment of this application.

FIG. 7 is a schematic diagram of data transmission between a first electronic device and a software system that is run on a target server and between a second electronic device and the software system. As shown in the figure, an interconnection relationship between the first electronic device and the software system is the same as the interconnection relationship shown in FIG. 4, and details are described above in detail with reference to FIG. 4. Therefore, for brevity, the details are not described herein again. The at least two subnets newly created on the second VPC may include, for example, a subnet 8 and a subnet 9 (namely, an example of the at least two subnets on the second VPC). Neither a network address segment of the subnet 8 nor a network address segment of the subnet 9 overlaps with the network address segment of the first VPC, or overlaps with the third network address segment of the second electronic device.

Therefore, a data packet sent by the software system to the second electronic device may be sent to the second electronic device in the third subnet after being sequentially forwarded through the subnet 8 and the subnet 9. Network address translation is separately performed for one time on the data packet in the subnet 8 and the subnet 9. A specific process is similar to the specific process in which the data packet is sent to the first electronic device through the subnet 5 and the subnet 6. For brevity, details are not described herein again.

The data packet sent by the second electronic device to the software system may be sent to the software system in the first subnet after being sequentially forwarded through the subnet 9 and the subnet 8. Network address translation is separately performed for one time on the data packet in the subnet 9 and the subnet 8. A specific process is similar to the specific process in which the data packet is sent to the software system through the subnet 6 and the subnet 5. For brevity, details are not described herein again.

It should be understood that a specific process for implementing interconnection between the second electronic device and the software system may be similar to the specific process described in step 310 and step 320. For brevity, details are not described herein again.

Based on the foregoing technical solution, when network address segment overlapping occurs between the second electronic device and the first electronic device, a new VPC is created for the second electronic device, and new subnets are created on the newly created VPC, to implement interconnection between the second electronic device and the software system. Because all network address segments of the subnets on the newly created VPC do not overlap with the network address segment of the first electronic device or the network address segment of the software system, a unique destination address can be found for a data packet in a process for transmitting the data packet. In this way, the data packet can be correctly transmitted between the second electronic device and the software system.

In this embodiment of this application, in a scenario in which a plurality of electronic devices access the software system, corresponding technical solutions are provided for both the case in which network address segment overlapping occurs between the software system and the electronic device and the case in which network address segment overlapping occurs between the electronic devices. Therefore, interconnection is implemented between the electronic device and the software system, and one center can be accessed by any quantity of users. In addition, in the technical solutions provided in this application, extra software system is not created. Therefore, implementation costs are relatively low, and a deployment period is relatively short.

In addition, this application further provides a method, to implement interconnection between electronic devices and a software system when network address segment overlapping occurs between the electronic devices, so that one center can be accessed by any quantity of users.

It should be noted that the method provided in this embodiment of this application may be performed by the foregoing first server, and may be specifically implemented by software by executing corresponding instructions, where the software is deployed on the server. The software may be, for example, software deployed on a virtual machine created on the server. The server may be, for example, a server provided on a VPC, or the server may be a server running on the VPC. A software system is run on the VPC. For example, the software system may be deployed on the server, or may be deployed on another server provided on the VPC. This is not limited in this application.

In some embodiments, a target server may be, for example, the target server described in the method 300, the first server may be, for example, the first server described in the method 300, and the VPC may be, for example, the first VPC described in the method 300. Related descriptions of the first VPC, the first server, the target server, and the software system in the method 300 are still applicable to this embodiment. For brevity, details are not described in a method 800 again.

FIG. 8 is a schematic flowchart of a data transmission method 800 according to another embodiment of this application. As shown in the figure, the method 800 may include step 810 and step 820.

Step 810: Determine that a fourth network address segment overlaps with a fifth network address segment.

The fourth network address segment may be a network address segment of a subnet in which a third electronic device is located. The third electronic device may be an electronic device that expects to access a software system on a target server, or an electronic device that expects to access a target server. In other words, there is no network connection relationship between the third electronic device and the target server. The fifth network address segment may be a network address segment of a subnet in which a fourth electronic device is located, and there is a network connection relationship between the fourth electronic device and the target server. In other words, the fourth electronic device is an electronic device that has accessed the target server. A specific process for obtaining the fourth network address segment and the fifth network address segment in this embodiment is similar to the specific process for obtaining the second network address segment that has been described in detail in step 310 in the method 300. Therefore, for brevity, details are not described herein again.

A method that is provided in this embodiment of this application and that is used when a network address segment of the software system overlaps with a network address segment of an on-premises electronic device has been described in detail in the method 300. In this embodiment, for ease of understanding and description, it is assumed that network address segments corresponding to all on-premises electronic devices do not overlap with the network address segment of the software system.

When the fifth network address segment overlaps with a first network address segment, interconnection may be implemented between the fourth electronic device and the software system by using the method described in the method 300. When the fifth network address segment does not overlap with a first network address segment, the fourth electronic device may directly establish a VPN connection to the software system to implement interconnection between the fourth electronic device and the software system.

The fourth electronic device may be a newly added electronic device that has accessed the software system before the fifth electronic device accesses the software system, or may be an electronic device that accesses the software system in advance. This is not limited in this application.

A specific method for determining, by a first server, whether the fourth network address segment overlaps with the fifth network address segment has been described in detail in step 310 in the method 300. For brevity, details are not described herein again.

When the fourth network address segment does not overlap with the fifth network address segment or the first network address segment, the first server may directly establish a VPN connection between a VPN gateway of the third electronic device and a VPN gateway on a first VPC. In this case, both the VPN connection between the third electronic device and the first VPC and a VPN connection between the fourth electronic device and the first VPC may be used for access to the software system through the VPN gateway on the first VPC.

When the fourth network address segment overlaps with the fifth network address segment, the following step may be performed. Step 820: Create at least one subnet on a third VPC, where a network address segment of any one of the at least one subnet does not overlap with the first network address segment, the fourth network address segment, or the fifth network address segment.

Therefore, a network interface in the at least one subnet is used to forward a data packet being transmitted by the target server to the third electronic device, so that the data packet is forwarded for at least one time during transmission of the data packet.

Correspondingly, the network interface in the at least one subnet is used to forward a data packet being transmitted by the third electronic device to the target server, so that the data packet is forwarded for at least one time during transmission of the data packet.

In some embodiments, the data packet is forwarded through each of at least one network interface after IP address translation is performed, the at least one network interface one-to-one corresponds to the at least one subnet, and an IP address of each network interface belongs to a corresponding subnet.

Figure 9:
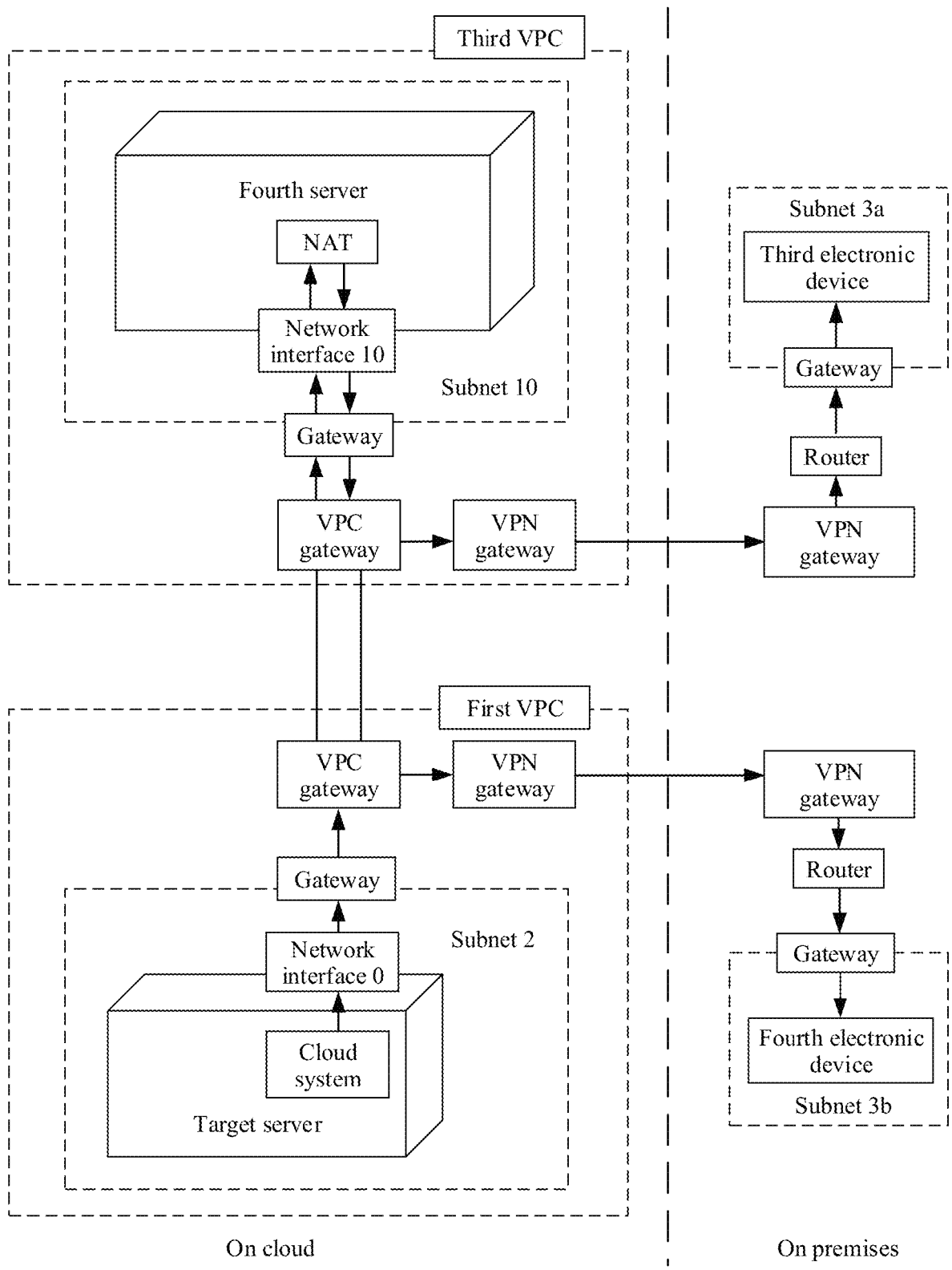
FIG. 9 is a schematic diagram of data transmission between a third electronic device and a software system that is run on a target server and between a fourth electronic device and the software system according to an embodiment of this application.

FIG. 9 is a schematic diagram of data transmission between a third electronic device and a software system that is run on a target server and between a fourth electronic device and the software system. As shown in the figure, the first server creates the third VPC on a public cloud. Interconnection may be, for example, implemented between the third VPC and the first VPC through a VPC peering connection between the VPCs. The subnet in which the third electronic device is located is, for example, a fourth subnet, and the fourth subnet may have, for example, the fourth network address segment. A subnet 3a shown in FIG. 9 is an example of the fourth subnet, and a network address segment 3 of the subnet 3a is an example of the fourth network address segment. The subnet in which the fourth electronic device is located is, for example, a fifth subnet, and the fifth subnet may have, for example, the fifth network address segment. Another subnet 3b shown in FIG. 9 is an example of the fifth subnet, and a network address segment 3 of the subnet 3b is an example of the fifth network address segment. Network address segment overlapping occurs between the third electronic device and the fourth electronic device.

The first server may create the at least one subnet on the third VPC. For ease of differentiation and description below, a subnet created on the third VPC is referred to as a subnet 10, and a network address segment of the subnet 10 may be referred to as, for example, a network address segment 10. In this embodiment, the network address segment 10 does not overlap with the first network address segment (a network address segment 2 of a subnet 2 shown in the figure) or the fourth network address segment (the network address segment 3 of the subnet 3a shown in the figure). Therefore, the subnet 10 may be connected between the first subnet in which the target server is located and the fourth subnet in which the third electronic device is located, and interconnection may be implemented between the software system and the third electronic device through the subnet on the third VPC.

It should be understood that the figure is merely an example and schematically shows one newly created subnet. However, this should not constitute any limitation on this application. There may be one or more subnets that are newly created.

After the at least one subnet is created, a route for transmitting a data packet between the third electronic device and the software system may be determined. For example, the route may be determined by the first server based on an interconnection relationship with the newly created subnet, or may be manually input by a staff member. This is not limited in this application. For example, the determined route may be stored in a gateway in each subnet in a form of a routing table, so that each subnet forwards a data packet based on the predetermined route after receiving the data packet.

As shown in the figure, a data packet sent by the software system to the third electronic device arrives at the third electronic device after being forwarded in the subnet 10, and a data packet sent by the third electronic device to the software system arrives at the software system after being forwarded in the subnet 10.

It should be understood that the figure is merely an example, and schematically shows an example in which the subnet 10 is connected between the third electronic device and the software system. However, this should not constitute any limitation on this application. For example, when a plurality of subnets are created on the third VPC, the data packet sent by the software system to the third electronic device may arrive at the third electronic device after being sequentially forwarded through network interfaces in the plurality of subnets, and the data packet sent by the third electronic device to the software system may arrive at the software system also after being sequentially forwarded through the network interfaces in the plurality of subnets.

In some embodiments, the method further includes: creating the third VPC. There is a communication connection between the third VPC and the first VPC. It should be understood that the third VPC may be a newly created VPC, or may be a VPC that originally runs on the public cloud. This is not limited in this application.

It should be noted that, in this embodiment of this application, that the first server creates the third VPC and creates the at least one subnet on the third VPC may be specifically implemented by the first server by invoking an API interface. The API interface may be invoked, to run a pre-compiled script; or related software may be invoked, to automatically create the VPC and the subnet. In a process for creating the VPC and the subnet, the API interface may present a dialog box to the staff member in a user interface, so that the staff member inputs the third VPC and a network address segment of each of the at least one subnet. The network address segment of the third VPC may be determined by the first server based on a network address segment of an existing VPC (for example, the first VPC). A network address segment of the at least one subnet may also be determined by the first server based on a network address segment that is of each subnet (for example, the first subnet and the fourth subnet) and that is obtained in advance. This is not limited in this application.

The network interface in the at least one subnet may be configured on a server provided on the third VPC. For ease of differentiation and description, the server is referred to as a fourth server.

In some embodiments, the method further includes: creating the fourth server on the third VPC; and configuring the at least one network interface on the fourth server.

When the at least one network interface is configured on a same server, the at least one network interface may share one NAT module for IP address translation. In other words, when receiving a data packet, a network interface in each of the at least one subnet may send the data packet to the NAT on the fourth server, to perform IP address translation on the data packet, and a data packet that has undergone IP address translation is returned to the network interface. The network interface may forward the data packet to a next destination IP address.

Certainly, the at least one network interface may alternatively use a NAT module separately for IP address translation. This is not limited in this application.

FIG. 9 shows an example in which a data packet is forwarded through a network interface on the fourth server. As shown in FIG. 9, one network interface, for example, referred to as a network interface 10, may be configured on the fourth server, and an IP address of the network interface 10 may belong to the subnet 10 (namely, an example of the at least one subnet).

Based on an interconnection relationship between the third electronic device and the software system shown in FIG. 9, the following further describes a route and a forwarding process for transmitting a data packet between the software system and the third electronic device. It should be noted that, for ease of understanding, the figure shows a data packet forwarding path for sending a data packet by the software system to the third electronic device. A data packet forwarding path for sending a data packet by the third electronic device to the software system is opposite, and for brevity, this data packet forwarding path is not shown in the figure. However, a person skilled in the art may obtain the corresponding forwarding path based on the following descriptions.

When the software system sends the data packet to the third electronic device, the software system may set, through a first network interface on the target server, a destination address of the data packet to an IP address that is of a network interface and that belongs to the subnet 10. Herein, for ease of differentiation and description, the network interface in the subnet 10 is referred to as a network interface 10, and the IP address of the network interface 10 is referred to as an IP address 10.

The data packet may be forwarded to a gateway in the subnet 10 through the first network interface on the target server on which the software system is run, and then forwarded by the gateway in the subnet 10 to the network interface 10. The network interface 10 may set a destination address of the data packet to an IP address that is of a network interface and that belongs to the subnet 3a (namely, an example of the fourth subnet). In other words, network address translation performed on the data packet for one time is complete.

The data packet may be forwarded to a gateway in the subnet 3a through the network interface 10, and then forwarded by the gateway in the subnet 3a to the third electronic device in the subnet 3a.

Therefore, the data packet sent by the software system can reach the third electronic device after the network address translation is performed on the data packet for one time. It should be understood that the figure is merely an example, and does not show each node that the data packet passes through. However, this should not constitute any limitation on this application. A person skilled in the art may understand that the data packet sent by the software system can reach the third electronic device after destination address translation is performed on the data packet.

When the third electronic device sends a data packet to the software system, the third electronic device may set, through the network interface, a destination IP address of the data packet to an IP address that is of a network interface and that belongs to the subnet 10. As described above, the network interface that belongs to the subnet 10 is referred to as the network interface 10, and the IP address of the network interface 10 is referred to as the IP address 10.

The data packet may be forwarded to a gateway in the subnet 10 through a network interface in the subnet in which the third electronic device is located, and then forwarded by the gateway in the subnet 10 to the network interface 10. The network interface 10 may set a destination IP address of the data packet to an IP address of a network interface 0. In other words, destination address translation performed on the data packet is complete. As described above, an IP address of the network interface 0 is the IP address of the target server on which the software system is run.

Therefore, the data packet sent by the third electronic device can reach the software system after network address translation is performed on the data packet. It should be understood that the figure is merely an example, and does not show each node that the data packet passes through. However, this should not constitute any limitation on this application. A person skilled in the art may understand that the data packet sent by the third electronic device can reach the software system after the destination address translation is performed on the data packet.

It should be further understood that the foregoing describes, with reference to FIG. 9, the data packet forwarding process by using an example in which one VPC and one subnet are newly created. It may be understood that, when a quantity of newly created subnets is N (N≥2, and N is an integer), destination address translation is also performed on the data packet for N times. There may be one or more VPCs that are newly created, and a quantity of newly created VPCs may be different from a quantity of newly created subnets. Both the quantity of newly created VPCs and the quantity of newly created subnets are not limited in this application.

Based on the foregoing technical solution, when network address segment overlapping occurs between the third electronic device that is to access the software system and the fourth electronic device that has accessed the software system, a new VPC and a new subnet are created for the third electronic device, to implement interconnection between the third electronic device and the software system. Because a network address segment of the subnet on the newly created VPC does not overlap with the network address segment of the fourth electronic device, the network address segment of the third electronic device, or the network address segment of the software system, a unique destination address can be found for a data packet in a process for transmitting the data packet. In this way, the data packet can be correctly transmitted between the third electronic device and the software system.

To improve reliability, a primary network interface and a secondary network interface may be further configured for the at least one subnet. The primary network interface and the secondary network interface may be configured on different servers. However, a same floating IP address may be configured for the primary network interface and the secondary network interface in a same subnet.

In some embodiments, the at least one network interface is a primary network interface. The method further includes:
creating a fifth server on the third VPC; and
configuring at least one secondary network interface on the fifth server, where the at least one secondary network interface one-to-one corresponds to the at least one primary network interface, a network address segment to which an IP address of each primary network interface belongs is the same as a network address segment to which an IP address of a corresponding secondary network interface belongs, and each primary network interface and a corresponding secondary network interface have a same floating IP address.

In some embodiments, the method further includes: allocating a same floating IP address to each primary network interface and a corresponding secondary network interface.

Specifically, at least two IP addresses may be set for each primary network interface, and the at least two IP addresses include one floating IP address. The floating IP address may be understood as an external IP address of the network interface. In other words, when a destination address of a data packet is set to the floating IP address of the network interface, the data packet may be routed to the network interface.

A specific process for implementing high availability in a primary/secondary mode is described in detail in step 330 and step 340 in the method 300. A specific process for configuring a secondary network interface and allocating a floating IP address in this embodiment is similar to a specific process for implementing high availability in a primary/secondary mode that has been described in detail in step 330 and step 340 in the method 300. Therefore, for brevity, details are not described herein again.

This embodiment of this application provides a corresponding technical solution for a scenario in which a plurality of electronic devices access the software system and network address segment overlapping occurs between the plurality of electronic devices. Therefore, interconnection is implemented between the plurality of electronic devices and the software system, and one center can be accessed by any quantity of users. In addition, in the technical solutions provided in this application, extra software system is not created. Therefore, implementation costs are relatively low, and a deployment period is relatively short.

It should be noted that the first server that is described in the method 300 and the method 800 and that performs the method for implementing interconnection between the software system and the electronic device may run, in a form of software, on a virtual machine provided by a public cloud provider, or may run on a virtual machine provided by a third party. This is not limited in this application. For example, a user may purchase a virtual machine from a third party, and deploy related software on the virtual machine, to implement the functions of the first server in the foregoing embodiments.

It should be understood that sequence numbers of the processes do not mean execution sequences in the foregoing embodiments. The execution sequences of the processes should be determined based on functions and internal logic of the processes, and should not constitute any limitation on the implementation processes in the embodiments of this application.

The foregoing describes, in detail with reference to FIG. 1 to FIG. 9, the data transmission method provided in the embodiments of this application. The following describes, in detail with reference to FIG. 10 and FIG. 11, a computer system provided in the embodiments of this application. It should be understood that the descriptions of the method embodiments correspond to descriptions of the apparatus embodiments. Therefore, for parts that are not described in detail, refer to the descriptions in the foregoing method embodiments.

Figure 10:
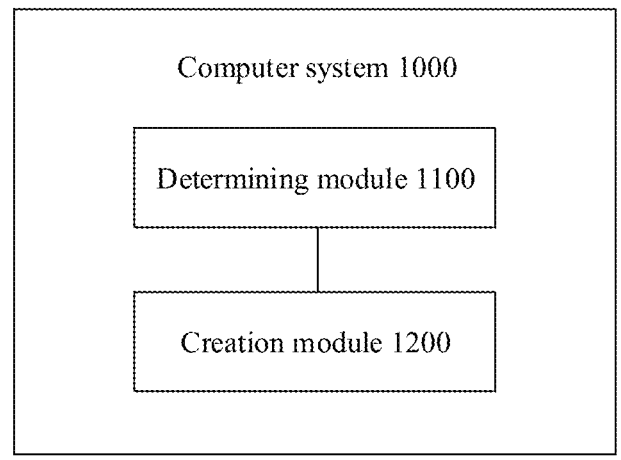
FIG. 10 is a schematic block diagram of a computer system according to an embodiment of this application.

FIG. 10 is a schematic block diagram of a computer system 1000 according to an embodiment of this application. As shown in the figure, the computer system 1000 may include a determining module 1100 and a creation module 1200.

In a possible design, the determining module 1100 may be configured to determine that a first network address segment overlaps with a second network address segment, where the first network address segment is a network address segment of a subnet in which a target server is located, the target server is a server running on a first virtual private cloud (VPC), the first network address segment belongs to a network address segment of the first VPC, and the second network address segment is a network address segment of a subnet in which a first electronic device is located. The creation module 1200 may be configured to create at least two subnets on the first VPC, where a network address segment of any one of the at least two subnets does not overlap with the first network address segment or the second network address segment, and network interfaces in the at least two subnets are used to sequentially forward a data packet being transmitted between the target server and the first electronic device, so that the data packet is forwarded for at least two times during transmission of the data packet.

In another possible design, the determining module 1100 may be configured to determine that a fourth network address segment overlaps with a fifth network address segment, where the fourth network address segment is a network address segment of a subnet in which a third electronic device is located, the fifth network address segment is a network address segment of a subnet in which a fourth electronic device is located, there is a communication connection between the fourth electronic device and a target server, the target server is a server running on a first virtual private cloud (VPC), an IP address of the first network interface belongs to a first network address segment, and the first network address segment belongs to a network address segment of the first VPC. The creation module 1200 may be configured to create at least one subnet on a third VPC, where there is a communication connection between the third VPC and the first VPC, and a network address segment of any one of the at least one subnet does not overlap with the first network address segment, the fourth network address segment, or the fifth network address segment, and a network interface in the at least one subnet is used to forward a data packet being transmitted between the target server and the third electronic device, so that the data packet is forwarded for at least one time during transmission of the data packet.

It should be understood that the computer system 1000 may correspond to the first server in the data transmission method 300 and method 800 in the embodiments of this application. The computer system 1000 may include modules configured to perform the method that is performed by the first server in the method 300 in FIG. 3 or the method 800 in FIG. 8. In addition, the modules in the computer system 1000 and the foregoing other operations and/or functions are separately intended to implement corresponding procedures in the method 300 in FIG. 3 or the method 800 in FIG. 8. Specific processes in which the modules perform the foregoing corresponding steps have been described in detail in the method embodiments. For brevity, details are not described herein again.

Figure 11:
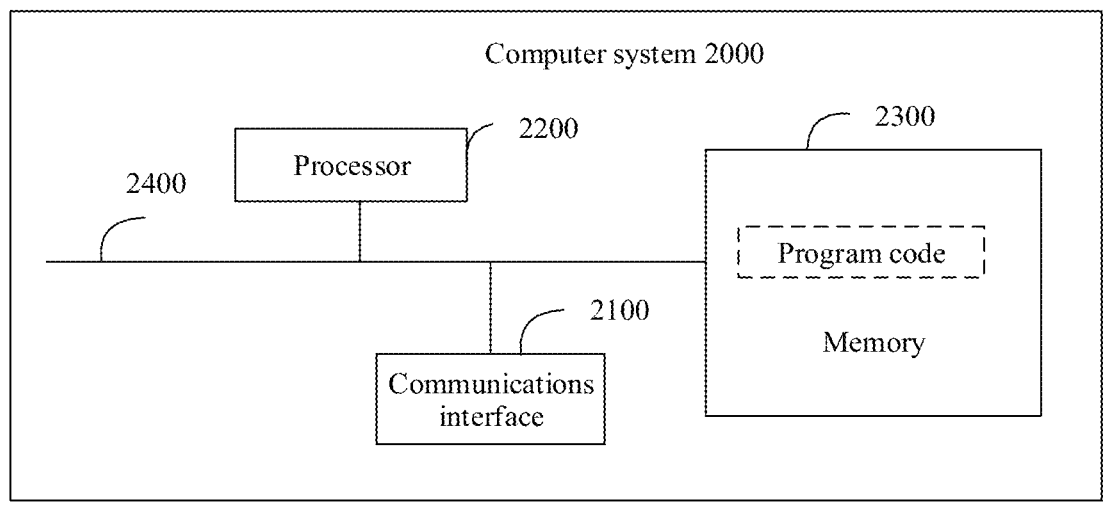
FIG. 11 is another schematic block diagram of a computer system according to an embodiment of this application.

FIG. 11 is a schematic block diagram of a computer system 2000 according to an embodiment of this application. As shown in the figure, the computer system 2000 may include a communications interface 2100, a processor 2200, and a memory 2300.

In some embodiments, the computer system 2000 may further include a bus 2400. The communications interface 2100, the processor 2200, and the memory 2300 may be connected to each other through the bus 2400. The bus 2400 may be a peripheral component interconnect (peripheral component interconnect, PCI for short) bus, an extended industry standard architecture (extended industry standard architecture, EISA for short) bus, or the like. The bus 2400 may be classified into an address bus, a data bus, a control bus, and the like. For ease of representation, one thick line is used to represent the bus in FIG. 11, but this does not mean that there is only one bus or only one type of bus.

The memory 2300 may be configured to store program code and data that are executed by the computer system. Therefore, the memory 2300 may be a storage unit inside the processor 2200, an external storage unit independent of the processor 2200, or a component including a storage unit inside the processor 2200 and an external storage unit independent of the processor 2200.

The processor 2200 may include one or more general-purpose processors. For example, the processor 2200 may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor 2200 may implement or execute various example logical blocks, modules, and circuits described with reference to content disclosed in this application. The processor may alternatively be a combination of implementing a computing function, for example, a combination of a plurality of microprocessors or a combination of a DSP and a microprocessor. The processor 2200 may be configured to run a program with a processing function in related program code. In other words, the processor 2200 may implement functions of a determining module and a creation module by executing the program code. For specific functions of the determining module and the creation module, refer to the related descriptions in the foregoing embodiment.

In a possible implementation, the processor 2200 is configured to run related program code to implement the functions of the first server in the foregoing method embodiments of this application, or to implement the method described in step 310 to step 340 shown in FIG. 3 in this application, or to implement the method described in step 810 to step 820 shown in FIG. 8 in this application, and/or other steps for implementing the technologies described in this specification. This is not described in detail or limited in this application.

The communications interface 2100 may be a wired interface (for example, an Ethernet interface) or a wireless interface (for example, a cellular network interface or a wireless local area network interface), and is configured to communicate with another module/device.

The memory 2300 may include a volatile memory (volatile memory) such as a random access memory (RAM), or the memory may include a non-volatile memory (non-volatile memory) such as a read-only memory (ROM), a flash memory (flash memory), a hard disk drive (HDD), or a solid-state drive (SSD), or the memory 2300 may include a combination of the foregoing types of memories. The memory 2300 may be configured to store a set of program code, so that the processor 2200 invokes the program code stored in the memory 2300 to implement functions of a communications module and/or a processing module in the embodiments of the present disclosure.

When the program code in the memory 2300 is executed by the processor 2200, the computer system 2000 is enabled to perform the method in the foregoing method embodiment 300 or 800.

In some embodiments, an embodiment of this application further provides a computer program product. The computer program product includes computer program code. When the computer program code is run on a computer, the computer is enabled to perform the method according to each of the foregoing aspects.

A person of ordinary skill in the art may be aware that, units and algorithm steps in examples described with reference to the embodiments disclosed in this specification can be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

Terminologies such as "component", "module", and "system" used in this application are used to indicate computer-related entities, hardware, firmware, combinations of hardware and software, software, or software being executed. For example, a component may be, but is not limited to, a process that is run on a processor, a processor, an object, an executable file, a thread of execution, a program, and/or a computer. As shown in figures, both a computing device and an application that is run on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process based on a signal having one or more data packets (for example, data from two components interacting with another component in a local system, a distributed system, and/or a network, such as the internet interacting with other systems by using a signal).

It should be further understood that in the embodiments of this application, "first", "second", "third", and the like are merely intended to indicate different objects, but do not represent other limitations on the indicated objects.

In addition, the terms "system" and "network" may be used interchangeably in this specification. The term "and/or" in this specification describes only an association relationship for describing associated objects and represents that there may be three relationships. For example, A and/or B may represent the following three cases: Only A exists, both A and B exist, and only B exists. In addition, the character "/" in this specification usually indicates an "or" relationship between the associated objects.

It may be clearly understood by a person skilled in the art that, for the purpose of convenient and brief description, for a detailed working process of the foregoing system, apparatus, or unit, refer to a corresponding process in the foregoing method embodiments. Details are not described herein again.

In the several embodiments provided in this application, it should be understood that the disclosed system, apparatus, and methods may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in this application.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, wherein the method comprises:
    determining that a first network address segment overlaps with a second network address segment, wherein the first network address segment is a network address segment of a subnet in which a target server is located, the target server is a server configured to run on a first virtual private cloud (VPC), the first network address segment belongs to a network address segment of the first VPC, and the second network address segment is a network address segment of a subnet in which a first electronic device is located; and
    creating at least two subnets on the first VPC, wherein a network address segment of one of the at least two subnets on the first VPC does not overlap with the first network address segment or the second network address segment, and network interfaces in the at least two subnets on the first VPC are configured to sequentially forward a data packet being transmitted between the target server and the first electronic device thereby causing the data packet to be forwarded at least two times during transmission of the data packet,
    wherein the data packet is forwarded through each of at least two network interfaces of the network interfaces after IP address translation is performed, the at least two network interfaces of the network interfaces corresponding to the at least two subnets, and an IP address of each network interface of the at least two network interfaces of the network interfaces belongs to a corresponding subnet.

2. The method according to claim 1, wherein the at least two network interfaces of the network interfaces are configured on the target server.

3. The method according to claim 1, wherein the method further comprises:
    creating a second server on the first VPC; and
    configuring the at least two network interfaces of the network interfaces on the second server.

4. The method according to claim 1, wherein the at least two network interfaces of the network interfaces corresponding to the at least two subnets are at least two primary network interfaces; and the method further comprises:
    creating a third server on the first VPC; and
    configuring at least two secondary network interfaces on the third server, wherein the at least two secondary network interfaces correspond to the at least two primary network interfaces, a network address segment to which an IP address of each primary network interface of the at least two primary network interfaces belongs is the same as a network address segment to which an IP address of a corresponding secondary network interface of the at least two secondary network interfaces belongs, and each primary network interface of the at least two primary network interfaces and a corresponding secondary network interface of the at least two secondary network interfaces have a same floating IP address.

5. The method according to claim 1, wherein the method further comprises:
    determining that a third network address segment overlaps with the first network address segment, wherein the third network address segment is a network address segment of a subnet in which a second electronic device is located; and
    creating at least two subnets on a second VPC, wherein the second VPC and the first VPC are communicatively coupled together, and a network address segment of one of the at least two subnets on the second VPC does not overlap with the first network address segment, the second network address segment, or the third network address segment, and network interfaces in the at least two subnets on the second VPC are configured to sequentially forward another data packet being transmitted between the target server and the second electronic device thereby causing the another data packet to be forwarded at least two times during transmission of the another data packet.

6. A computer system, comprising:
a processor, and a memory configured to store non-transitory instructions, and in response to the nontransitory instructions being executed by the processor, causes the computer system to:

- determine that a first network address segment overlaps with a second network address segment, wherein the first network address segment is a network address segment of a subnet in which a target server is located, the target server is a server configured to run on a first virtual private cloud (VPC), the first network address segment belongs to a network address segment of the first VPC, and the second network address segment is a network address segment of a subnet in which a first electronic device is located; and
- create at least two subnets on the first VPC, wherein a network address segment of one of the at least two subnets on the first VPC does not overlap with the first network address segment or the second network address segment, and network interfaces in the at least two subnets on the first VPC are configured to sequentially forward a data packet being transmitted between the target server and the first electronic device thereby causing the data packet to be forwarded at least two times during transmission of the data packet,
- wherein the data packet is forwarded through each of at least two network interfaces of the network interfaces after IP address translation is performed, the at least two network interfaces of the network interfaces corresponding to the at least two subnets, and an IP address of each network interface of the at least two network interfaces of the network interfaces belongs to a corresponding subnet.

7. The computer system according to claim 6, wherein the at least two network interfaces of the network interfaces are configured on the target server.

8. The computer system according to claim 6, wherein in response to the non-transitory instructions being executed by the processor, further causes the computer system to:
create a second server on the first VPC, and configure the at least two network interfaces of the network interfaces on the second server.

9. The computer system according to claim 6, wherein the at least two network interfaces of the network interfaces corresponding to the at least two subnets are at least two primary network interfaces; and
in response to the non-transitory instructions being executed by the processor, further causes the computer system to:
create a third server on the first VPC, and configure at least two secondary network interfaces on the third server, wherein the at least two secondary network interfaces correspond to the at least two primary network interfaces, a network address segment to which an IP address of each primary network interface of the at least two primary network interfaces belongs is the same as a network address segment to which an IP address of a corresponding secondary network interface of the at least two secondary network interfaces belongs, and each primary network interface of the at least two primary network interfaces and a corresponding secondary network interface of the at least two secondary network interfaces have a same floating IP address.

10. The computer system according to claim 6, wherein in response to the nontransitory instructions being executed by the processor, further causes the computer system to:
- determine that a third network address segment overlaps with the first network address segment, wherein the third network address segment is a network address segment of a subnet in which a second electronic device is located; and
- create at least two subnets on a second VPC, wherein the second VPC and the first VPC are communicatively coupled together, and a network address segment of one of the at least two subnets on the second VPC does not overlap with the first network address segment, the second network address segment, or the third network address segment, and network interfaces in the at least two subnets on the second VPC are configured to sequentially forward another data packet being transmitted between the target server and the second electronic device thereby causing the another data packet to be forwarded at least two times during transmission of the another data packet.

* * * * *